(12) United States Patent
Kerner et al.

(10) Patent No.: US 7,146,191 B2
(45) Date of Patent: Dec. 5, 2006

(54) WIRELESS COMMUNICATIONS APPARATUS AND METHOD

(75) Inventors: James M. Kerner, Chico, CA (US); Chad Parker, Chico, CA (US)

(73) Assignee: United States Thermoelectric Consortium, Chico, CA (US)

( * ) Notice: Subject to any disclaimer, the term of this patent is extended or adjusted under 35 U.S.C. 154(b) by 0 days.

(21) Appl. No.: 10/919,811

(22) Filed: Aug. 16, 2004

(65) Prior Publication Data

US 2005/0159184 A1  Jul. 21, 2005

Related U.S. Application Data

(60) Provisional application No. 60/567,836, filed on May 3, 2004, provisional application No. 60/537,384, filed on Jan. 16, 2004.

(51) Int. Cl.
*H04B 1/38* (2006.01)

(52) U.S. Cl. .................. 455/558; 455/557; 455/411; 455/410; 455/435.1; 455/550.1; 235/488; 235/487; 235/492

(58) Field of Classification Search ............... 455/403, 455/435.1, 411, 558, 41.2, 422.1, 557, 550.1, 455/410, 575.1, 575.8; 235/488, 487, 492
See application file for complete search history.

(56) References Cited

U.S. PATENT DOCUMENTS

| | | | |
|---|---|---|---|
| 4,005,269 A | 1/1977 | Willis | |
| 4,658,096 A | 4/1987 | West, Jr. et al. | |
| 4,737,975 A | 4/1988 | Shafer | |
| 4,775,997 A | 10/1988 | West, Jr. et al. | |
| 4,922,517 A | 5/1990 | West, Jr. et al. | |
| 5,010,565 A | 4/1991 | Nash et al. | |
| RE33,873 E * | 4/1992 | Romano | 340/543 |
| 5,469,494 A | 11/1995 | Ortiz Perez et al. | |
| 5,563,931 A | 10/1996 | Bishop et al. | |
| 5,715,296 A | 2/1998 | Schornack et al. | |
| 5,812,637 A | 9/1998 | Schornack et al. | |
| 5,859,894 A | 1/1999 | Ortiz Perez et al. | |
| 5,946,616 A | 8/1999 | Schornack et al. | |
| 5,956,631 A * | 9/1999 | Gerszberg et al. | 455/403 |
| 5,966,428 A | 10/1999 | Ortiz Perez et al. | |
| 5,995,492 A | 11/1999 | Klein et al. | |
| 6,023,621 A | 2/2000 | Jackson et al. | |
| 6,115,604 A * | 9/2000 | Lester et al. | 455/422.1 |
| 6,167,271 A | 12/2000 | Parker et al. | |
| 6,208,627 B1 | 3/2001 | Menon et al. | |

(Continued)

*Primary Examiner*—George Eng
*Assistant Examiner*—Khai Nguyen
(74) *Attorney, Agent, or Firm*—The Webostad Firm

(57) ABSTRACT

A wireless communication method and apparatus are described for increasing security for communication devices utilizing identification chips for accessing wireless networks and the associated billing for services. One aspect of the invention is an enhanced phone chip and a communications device adapted to engage the enhanced phone chip, which then cannot be installed or removed from the wireless communications device by unauthorized users. In one embodiment a security key mates to the identification chip and is utilized for installing and removing the enhanced phone chip. The security key preferably has a display upon which information about the communication device is displayed prior to removing the security key after installing the enhanced phone chip. Other aspects of the invention include wireless base station communication devices which support wired (dedicated and non-dedicated), and more preferably wireless extensions, while providing sharing of wireless network resources and interconnectivity between base station and extensions.

42 Claims, 10 Drawing Sheets

U.S. PATENT DOCUMENTS

| | | |
|---|---|---|
| 6,374,110 B1 | 4/2002 | Parker et al. |
| 6,470,190 B1 * | 10/2002 | Karhu .................... 455/550.1 |
| 6,554,193 B1 * | 4/2003 | Fehrman et al. ............ 235/488 |
| 6,690,930 B1 * | 2/2004 | Dupre ....................... 455/411 |
| 6,775,522 B1 * | 8/2004 | Schornack et al. ........ 455/74.1 |
| 6,799,057 B1 * | 9/2004 | Liverotti .................... 455/558 |
| 2001/0039197 A1 | 11/2001 | Barkan |
| 2003/0083044 A1 * | 5/2003 | Schreyer et al. ............ 455/411 |
| 2003/0190908 A1 * | 10/2003 | Craven ...................... 455/411 |
| 2003/0224728 A1 * | 12/2003 | Heinonen et al. .......... 455/41.2 |
| 2004/0123113 A1 * | 6/2004 | Mathiassen et al. ........ 713/185 |
| 2004/0176129 A1 * | 9/2004 | Menon et al. ........... 455/554.1 |
| 2004/0180657 A1 * | 9/2004 | Yaqub et al. ............ 455/435.1 |
| 2005/0009503 A1 * | 1/2005 | Bourke et al. .............. 455/411 |
| 2005/0153742 A1 * | 7/2005 | Choi .......................... 455/558 |
| 2005/0164737 A1 * | 7/2005 | Brown ....................... 455/558 |

\* cited by examiner

WIRELESS COMMUNICATIONS APPARATUS AND METHOD

CROSS-REFERENCE TO RELATED APPLICATIONS

This application claims priority from U.S. provisional application Ser. No. 60/537,384 filed on Jan. 16, 2004, incorporated herein by reference in its entirety. This application also claims priority from U.S. provisional application Ser. No. 60/567,836 filed on May 3, 2004, incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

STATEMENT REGARDING FEDERALLY SPONSORED RESEARCH OR DEVELOPMENT

Not Applicable

BACKGROUND OF THE INVENTION

1. Field of the Invention

This invention pertains generally to wireless telephone systems, and more particularly to secure wireless communications from personal mobile communication devices and fixed location group oriented communication devices.

2. Description of Related Art

Over the past few decades mobile phones (i.e. cellular and satellite) have evolved in a number of ways, becoming more central to our connected lifestyles. These mobile phones are being used for voice communications (i.e. over the cellular network or in peer-to-peer connectivity), emails, and network browsing. In addition non-traditional functions are supported including financial transactions such as the charging of goods and services using the cellular phone, the sending still and streaming images, providing personal digital assistant functionality, and other applications. The ubiquity of cellular phones has even begun overlapping traditional wired-line functionality.

Major U.S. corporations have seen the benefit of interfacing cellular phones with conventional, wired, land line phones. In fact, companies such as Siemens®, Northern Telecom Limited®, Nortel Networks Limited®, and Tellular® have received patents for interfacing cell phones with land line conventional wired systems.

One such device provides a dial-tone interface for coupling between satellite phones in a wired phone network (i.e. multiple phones in a home or office environment) and a cellular phone. This can for example, replace the conventional wired connection from the home or office to a central office with a wireless cellular communication system. With the dial-tone interface installed on a small wired phone network, conventional phones attached to the network, such as through RJ-11 input jacks, can make and receive calls through the dial-tone interface which communicates wirelessly by cellular and/or satellite protocols. In this way conventional wired phones and functionality can be utilized. Many areas of the world lack wired-line infrastructure and must rely on wireless connectivity generally provided with cellular and satellite systems. By utilizing a cellular phone base coupled through a dial-tone network a number of phone "extensions" can be supported, such as in residential and business settings without the need of separate cellular connectivity at each phone or FAX.

Some systems on the market utilize existing cellular phones which are connected to the dial-tone interface either by an adapter cable or as a charging cradle. In other systems a mobile phone chip, such as removed from a cellular phone, is installed within the dial tone interface. Systems are also available which act like a small PBX to route calls to/from either a cellular network or a wired-line phone network.

One of the drawbacks of these innovations is that they utilize new and dynamic analog and digital cell systems and link them to an antiquated wired-line telephone communications segment. The cost and complexity of converting between cellular protocols and wired protocols should be appreciated, especially since advanced cell systems have no need for "dial tones."

Conventional mobile telephones use identification cards or chips, such as I.D. SIM cards, that can not be readily installed or removed from a given cellular phone device. These cellular phone devices typically require the removal of an access panel, and then a set of batteries before removing or installing the I.D. SIM card. However, anyone can remove the phone chips from current-art telephones, as no security is currently available. This brings up another problem with utilizing these wireless solutions, especially in fixed base operations, which is theft of the phone chip.

It should be noted that on a wired-line system, calls are billed based on which calls passed through the wired infrastructure. However, with cellular calls a removable "phone chip" is connected within the phone to provide an identifier necessary for accessing the network and for providing billing identification information for the call. These phone chips are often stolen from mobile cellular phones allowing the perpetrator to charge both calls and services to the owner of the phone from which the "phone chip" was taken. It will be appreciated that the use of fixed base cellular configurations provide even easier targets for phone chip theft.

Therefore, a need exists for advanced wireless telephone communication systems which can be utilized securely with wireless networks and wired networks. The present system fulfills that need and overcomes the problems associated with deploying wireless phone connectivity in homes, offices, and vehicles.

BRIEF SUMMARY OF THE INVENTION

An apparatus and method for providing enhanced wireless network connectivity toward making wireless connectivity more secure and readily acceptable in home, office, and vehicular environments. The apparatus has features which can be utilized in personal communicator devices and wireless base stations to which wired or wireless extension telephones can be coupled. In addition aspects of the present invention have wide applicability across a range of telephone products and other portable electronic devices.

One important aspect of the invention overcomes the security problems which arise with cellular phones utilizing conventional "phone chips", such as identification SIMMs, which identify the billing party. These phone chips can be readily stolen from a system and utilized by perpetrators for make unauthorized calls. In one class of embodiments for the present invention, an enhanced "phone chip" is provided which provides the identification functions of current phone chips, but which cannot be inserted or removed from a system by unauthorized parties.

One embodiment of the enhanced phone chip is utilized with a matching security key which fully, or in part, controls the installation and removal of the enhanced phone chip from a cellular device. Although a mechanical locking mechanism can be utilized to provide mechanical security, more preferred embodiments utilize an electromechanical locking means controlled fully or in part by the security key.

The locking mechanism is preferably configured so that unauthorized removal of the enhanced phone chip sufficiently damages the identification chip wherein it is no longer serviceable and the associated wireless network can not be accessed. The enhanced phone chip may be designed so that the damage arises from mechanical frangibility, electrical frangibility or erasure, or combinations thereof.

In one embodiment the enhanced phone chip is configured for being mechanically coupled (mated) to the security key. The security key is configured for communicating with the communications device into which the enhanced phone chip is to be inserted, such as by an electrical interconnection. Electrical connections may also be optionally provided between the security key and the enhanced phone chip allowing the security key to detect the proper enhanced phone chip and to allow for communicating information to and from the enhanced phone chip when the security key and phone chip are not coupled to a communications device.

The enhanced phone chip is installed into a communications device (or other desired device to which access to data memory of the enhanced phone chip is to be provided) according to one embodiment using a security key. During installation, the enhanced phone chip becomes mechanically engaged within the new recipient communications device. After installation, the security key is removed from the device leaving the enhanced phone chip still installed. The enhanced phone chip is locked into the device and cannot be removed without the security key.

Preferably, the mechanical engagement mechanism is designed so that forced removal of the enhanced phone chip from the recipient device renders the enhanced phone chip inoperable. Optionally, the enhanced phone chip, and/or the recipient system, may be configured to generate an alert (i.e. a "distress" call to a desired party) in response to detecting a forced removal attempt. By way of example, electromechanical engagement mechanisms include solenoids, nitinol actuators, motorized actuators, and any other convenient electromechanical devices that can sufficiently engage the housing of the enhanced phone chip, such as recesses or apertures within the housing.

Alternatively, prevention of removal and reuse of the enhanced phone chip can be performed by electrical forms of "locking". For example, removal of an enhanced phone chip without a corresponding security key can create electrical damage or can program the device into an unusable mode, preventing viable use by other than the key holder. In one embodiment of this mechanism, shorter interconnection fingers on the connector and/or enhanced phone chip suffer a loss of contact as a first indication that a phone chip is being removed while the remaining connections are still usable for establishing the electrical change to the enhanced phone chip. Therefore, time is provided between the time a loss of contact arises on the sense contacts and the remainder of the contacts so that electrical locking can be activated to render the chip non-viable. Other mechanisms may also be employed to detect attempts at removal of the enhanced phone chip for controlling the electrical locking. In any case the electrical locking either overcomes or limits the viability of the enhanced phone chip. The electrical locking can be accomplished in a number of alternative ways, including but not limited to the use of fusible links, electrically activated charges, electrically releasable adhesives (i.e. ElectRelease™), non-volatile programming, and so forth.

It should be appreciated that the novel enhanced phone chip may be utilized in non-telephonic electronic devices to provide enhanced security. For example, to increase content security for cameras (i.e. still, video, or combination), audio systems (i.e. MP3 players), personal digital assistants (PDAs), laptop computers, digital wallets, and so forth. In this way the paradigm is extended, wherein the security advantages provided by the enhanced phone chip are extended to a wide range of electronic devices. It is interesting to note that as a society we have been primarily concerned with the physical loss of possessions, wherein we lock up our automobiles and possessions within the home. However, when electronics are stolen we are often more concerned with the proprietary materials contained therein than the hardware devices themselves. The hardware can be insured but information in the wrong hands can have long-lasting adverse effects. In addition, the materials may constitute a loss of privacy, to personal information, banking information, personal correspondence, and other sensitive information.

The enhanced phone chip preferably combines the functions of a SIMM chip holding the wireless network identification code(s), Extra Memory for retaining user and system specific information and optional Processing Power for executing operations. The enhanced phone chip can be generally referred to herein as a SEMPP chip. It should be appreciated, however, that the SEMPP device need not be configured in a SIMM configuration. Various embodiments of the SEMPP device are described including one which provides security of the communication path (i.e. encryption), and ones which are configured for supporting local wireless communication protocols, such as according to the "Bluetooth™" specification or other wireless signaling protocols. In these wireless embodiments the communications device can detect the presence of other compatible wireless devices, wherein they can automatically establish group relationships with one another based on identification and information stored about group operations in the enhanced phone chip.

An embodiment of the invention describes an all-wireless communication system which retains the advantages of traditional wired-line communication, such as sharing communication pathways, extension capability, transferring calls, conference calling, local voicemail control, and so forth. This system can be configured to alternatively, or additionally, support wired-line connectivity via traditional phone wiring or more using AC line signal superposition techniques. In either case, the security and flexibility of this system can significantly benefit from the use of the enhanced phone chip and security key previously described.

Since the connectivity for the present system is derived from wired AC connections, wireless links, or portions of telephone cable networks the use of the telephone based services, according to this aspect of the invention does not disrupt the use of either broadcast cable, satellite video, or other conventional services. The present device allows the user to communicate way of voice or images through a handset, speaker phone, wireless handsets and similar devices (i.e. cameras, an provided by the present system.

As an aid to understanding the present invention, information follows regarding the use of a few of the terms utilized within the specification and claims, however, it is to be appreciated that these terms are provided for convenience and not as a substitute for other recitations within the specification and claims.

Wireless network—a wireless communications infrastructure which provides access to users of registered accounts in response to the receipt of a valid identification code(s) as part of the wireless communications from a wireless communications device. The network spans a geographic region which generally extends beyond the range of the communications device and typically connects to other networks providing country-wide or more typically global connectivity.

Wireless communications device—an electronic device configured for accessing a wireless network. Often referred to herein simply as "communications device". These communication devices can be private in nature or directed toward providing group connectivity, such as multiple-identification chip base stations. By way of example and not of limitation, the communications device may be selected from the group of wireless devices consisting essentially of telephones, modems, personal digital assistants, smart watches, smart wallets, personal transaction devices, general purpose computers, laptop computers, palmtop computers, tablet computers, electronic books, audio players, game players, video and audio capture devices, communication base stations configured for receiving multiple identification cards, and communications modules for attachment to electronic equipment. The invention generally describes two broad classes of communication device: (1) a personal or primary communications device which is portable and typically associated with a given user, or family which may share the device; (2) a base station communications device which is less apt to be used in a portable manner because it supports a number of extensions which can be provided wireless network access and which is typically capable of receiving multiple enhanced phone chips.

Receptacle for identification chip—an element of the communications device which is configured to receive an identification chip, or enhanced phone chip, and to provide electrical connectivity to that identification chip, or enhanced phone chip. Typically the receptacle comprises a slot into which the identification chip, or enhanced phone chip, is slidably engaged toward a mating position with electrical contacts at the base of the receptacle.

Identification chip—an identification chip contains security information necessary to allow a communications device to access a wireless network. Current identification chips are proprietary to each wireless network. Services rendered over the wireless network are billed to the party associated with the identification chip (i.e. registering party or organization). Embodiments of the present invention can be implemented utilizing a conventional identification chip, however, preferred embodiments utilize an enhanced phone chip which contains a proper identification for accessing one or more wireless networks, along with features such as being configured for electro-mechanical locking within a communications device, the addition of writable memory, and/or processing capability.

Enhanced phone chip—an enhanced version of an identification chip for use in cellular phones and other communication devices having wireless network connectivity. This term will be utilized within the invention, but it should be appreciated that many of the features described for use with the enhanced phone chip can be utilized with an identification chip, or identification chip modified according to the invention, without departing from the teachings of the present invention.

Security key—a device utilized for effecting the installation and removal of identification chips, or more preferably enhanced phone chips, from a communications device. The security key preferably can retain the identification chip, or enhanced phone chip, for attachment to a communications device. In a preferred configuration the security key is inserted within a slot in the communications device for installing or removing an identification chip, or enhanced phone chip.

The apparatus and method of the invention are conducive to a number of embodiments and describe numerous inventive aspects. By way of example the invention may be generally described as an apparatus for providing wireless network connectivity, comprising: (a) an electronic communications device configured for wirelessly communicating with a wireless network; (b) a receptacle on the electronic communications device for receiving and establishing electrical connections with an identification chip configured for gaining access to the wireless network; and (c) means for preventing the unauthorized removal of an identification chip received in the receptacle. Preventing removal of the identification chip is described in one embodiment as an electromechanical locking mechanism whose operation is subject to receiving authorization. In one embodiment a security key is configured for providing authorization to control the insertion or removal of the identification chip from the communications device.

The apparatus may also be described as an apparatus for providing wireless network connectivity, comprising: (a) an electronic communications device configured for providing wireless connectivity through a network; (b) an identification chip configured for retaining identification information for use in accessing the network by the electronic communications device; (c) a receptacle in the electronic communications device for receiving and establishing electrical connections with the identification chip; and (d) an electromechanical lock configured for selectively retaining the identification chip within the receptacle to prevent unauthorized removal. In one embodiment the receptacle is configured as a slot into which the identification chip is inserted or removed in combination with a security key. The security key and communications device communicate to verify that the security key matches the identification chip, as well as other optional security measures, prior to unlocking and removal of the identification chip.

The apparatus may also be described as an improvement to wireless communication devices which retain an identification chip for gaining wireless network access, comprising: (a) at least one receptacle for receiving and establishing electrical connections with at least one identification chip containing information necessary for accessing a wireless network; and (b) an electromechanical lock configured for selectively retaining an identification chip within the receptacle to prevent unauthorized removal.

An embodiment of the apparatus may be described as an apparatus for sharing wireless network connectivity between a plurality of extensions, comprising: (a) a base station configured for providing wireless connectivity through a wireless network; (b) a plurality of receptacles in the base station configured for receiving and establishing electrical connections with identification chips that provide access to a wireless network; (c) an electro-mechanical lock configured for preventing unauthorized removal of identification chips from the plurality of receptacles; (d) means for communicating between the base station and a plurality of extensions; and (e) means for sharing wireless connectivity of the base station, within whose receptacles have been received at least one identification chip, with one or more of the plurality of extensions.

The identification chip according to an embodiment of the invention, provides an enhanced phone chip, comprising (a) a readable data memory containing information required for accessing a wireless network; (b) a housing into which the data memory is retained; (c) electrical connections on the readable data memory through which information in the data memory may be read by a wireless communications device into which the identification chip has been installed; (c) means for being sufficiently mechanically engaged by an electromechanical retention element within a wireless communications device so as to prevent unauthorized removal.

A communications device activation method of the present invention may be generally described as a method of activating a wireless communication device for accessing a wireless network, comprising: (a) inserting the combination of phone chip and security key into a receptacle on a wireless communications device configured for accessing a wireless network based on identification information retained in the phone chip; (b) generating an alert and preventing engagement and use of the phone chip if it is not registered on the wireless communications device; and (c) engaging an electromechanical lock to prevent unauthorized removal of the phone chip. Other embodiment of the method can further include (i) verifying the correspondence between the phone chip and the security key prior to engagement or use of the phone chip, (ii) removing the security key after the phone chip has been locked into the communications device, (iii) communicating information to the security key about the communications device into which the phone chip has been installed, and (iv) establishing communications settings or group connectivity within the communications device in response to information extracted from the phone chip.

Descriptions of the present invention include numerous beneficial aspects, including but not limited to the following.

An aspect of the invention provides a means of securely interconnecting an enhanced phone chip to a given system, such as a communications device or system.

Another aspect of the invention provides for the storage of communications and/or other personality control parameters within an enhanced phone chip which can be interconnected with different systems.

Another aspect of the invention provides an integrated circuit which can be implemented as an enhanced phone chip provided an extended form of cellular phone identification chip which includes additional memory storage space and an optional processing element.

Another aspect of the invention provides for the enhanced cell chip to operate across a range of cellular transmission types, such as analog, digital, GSM, satellite, newer protocols, and combinations thereof.

Another aspect of the invention provides an enhanced phone chip that can only be connected and disconnected from an electronic system in response to identification of the person attempting to remove and/or insert the chip.

Another aspect of the invention provides for the insertion or removal of the enhanced phone chip for authorized parties, such as those using a security key device coded to match (correspond) with the enhanced phone chip being inserted or removed.

Another aspect of the invention provides an enhanced phone chip that is interconnected into a communication device or system and retained by an electro-mechanical latching mechanism controls fully or in part by a security key device.

Another aspect of the invention provides a security key device configured to display information about the communications device or system into which one or more associated enhanced phone chips are being, or have been, installed.

Another aspect of the invention provides enhanced communication capability which may be utilized with wired-line telephone systems, or more particularly in situations in which wireless communications (i.e. cellular, satellite and so forth) are utilized instead of wired-line systems.

Another aspect of the invention provides a multi-extension wireless communication system which is transportable and adaptable to the insertion and removal of enhanced phone chips by authorized users.

Another aspect of the invention provides a mechanism for transporting a user environment, containing communications, into different environments.

Another aspect of the invention provides a secure means of establishing a preferred environment in a portable device or at a base station within home, office, or travel environments (i.e. personal vehicle, public transport, airline flights and so forth).

Another aspect of the invention provides for programming which is executable in wireless communication devices (i.e. personal or base stations) for preventing utilization of an enhanced phone chip which has not been registered for use on the given communications device.

Another aspect of the invention provides for programming in target base stations which can control the resources made available to a connected enhanced phone chip in response to parameters of its registration (i.e. priority and authority).

Another aspect of the invention provides wireless base stations which may be utilized in a home, business, remote location, or vehicle and is independent of land-line telephone carriers.

Another aspect of the invention provides wireless base stations which can be connected by wire or through local wireless transmissions with extension devices located at any desired locations within the range of the local wireless transmissions.

Another aspect of the invention provides repeaters comprising amplification circuits and antennas for extending the range of wireless communications system which are wired or more preferably wirelessly coupled to the repeater.

An additional aspect of the invention combines peer-to-peer communication, such as using wireless Bluetooth™ enabled devices or similar, and cellular communication devices, wherein wireless phone networks can be established which are controlled in response to the data in one or more identifier/personality modules.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 10B. It will be appreciated that the apparatus may vary as to configuration and as to details of the parts, and that the method may vary as to the specific steps and sequence, without departing from the basic concepts as disclosed herein.

1. Overview of Wireless Connectivity with Shared Line

Figure 1:
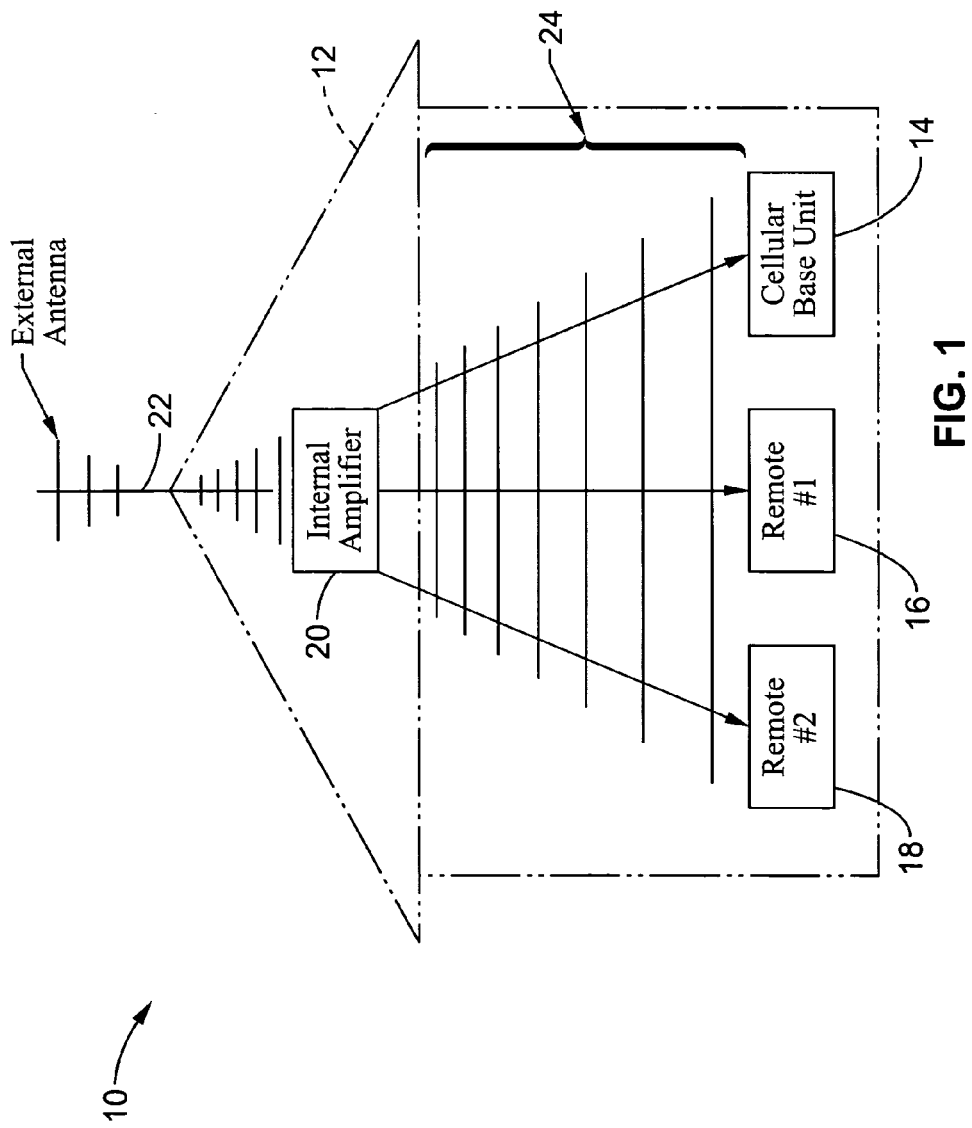
FIG. 1 is a block diagram of a cellular communications system according to an aspect of the present invention from within a structure configured with a cellular base station and remote units communicating through an internal amplifier antenna combination.

FIG. 1 illustrates an example of wireless system 10 providing wireless connectivity to a telephone network as deployed within a business, home, vehicle or other location 12. System 10 is shown supporting shared connectivity over a wireless communications connection, such as wireless communications utilizing cellular, satellite, or other forms of wireless network connectivity. In the embodiment shown the cellular connectivity is controlled through a cellular base unit 14 to which one or more remote units (extensions) 16, 18 can be coupled, such as through wireless connections and/or wired connections. In this embodiment each of the units 14, 16, 18 is shown communicating with the outside through an amplifier 20, whose external wireless communication connectivity is shown coupled through an antenna 22, such as to a cellular or satellite system. Antenna systems may be needed in some locations to insure state-of-the-art clarity, such as depending on the interference and distance for the signal to reach a cellular node. It should be appreciated that the wireless system could be deployed in large buildings that contain thousands of phone users connected on the system.

It should be appreciated that units 14, 16, 18 may communicate directly within one another over the local wireless connectivity, such as within a peer-to-peer communication configuration. Unit-to-unit connectivity 24 can comprise secure wireless communications (i.e. scrambled or encrypted), or non-secure communications. By way of example peer-to-peer connectivity can be implemented under the Bluetooth™ specification or other local wireless connective means. By way of another example, power line signaling may be utilized wherein unit-to-unit connectivity is provided by communicating signals over the AC line that is powering the devices, the communications can be encrypted if desired.

In one embodiment, base unit 14 contains at least one phone chip having an identifier for the wireless network, or more preferably an enhanced phone chip according to the invention. In this embodiment the base unit controls access to the wireless or satellite communications path through amplifier 20 and antenna 22. The remote units in this embodiment are configured to communicate through base unit 14 when receiving or transmitting on the cellular or satellite connection. This configuration reduces communication costs for the system since the only phone subject to cellular (or satellite) charges is the base unit. The remote units and base unit can communicate at any time with one another using local communications (i.e. wireless, power-line, or wired-line connectivity such as telephone wiring) without incurring any network charges. When outside connectivity is required, the remote phones share the cellular (satellite) connectivity with the base unit. In this embodiment remote phones 16, 18 share a common outside line with base unit 14. This mode can be used to provide similar functionality to phone extensions within a business which share a limited number of outside lines. Alternatively, the remote phones can contain their own phone chips, preferably enhanced, which allows them to access their own phone lines for establishing non-local communications.

Alternatively, remote units 16, 18, may communicate through a form of gateway, such as integrated within amplifier 20, or elsewhere. Base unit 14 in this embodiment is preferably configured for controlling the access of remote units 16, 18, which contain their own phone chip, through the combination of optional amplifier 20 and antenna 22.

The base unit 14 can be additionally or alternatively configured for supporting wired line phones which connect to the base station through telephone wiring. In one embodiment of a wired-line configuration the wired lines are implemented as conventional telephone lines which connect to the remote units using conventional RJ-11 connectors. Wired connectivity can also be provided by superposing communication signals over the power-line (i.e. AC power line) that supplies power to the devices.

It should be appreciated that the above system can be utilized with wireless and/or wired connectivity between the units. However, the present invention is particular well-suited for replacing outdated and inconvenient wired-line configurations with fully wireless deployments which provide numerous benefits, such as adaptability without the need of installing or reconfiguring communication wiring. So one benefit of the present invention is that it allows for the total elimination of phone wiring and wired-line telephone systems. It should be appreciated that wired-line telephone connections are often referred to as "land-lines". Utilizing the present invention, the capability is provided for creating totally wireless transportable communication systems which are secure while providing all the functionality of current land-line based systems without the infrastructure overhead and adaptability limitations.

2. Primary Communicators Utilizing Enhanced Phone Chips

In order to establish wireless network connectivity, conventional wireless cellular telephones use identification chips (i.e. I.D. SIM cards) that are not readily inserted or removed. Installing and removing identification chips usually requires the removal of housing access panels and batteries before removing or installing a SIM card. However, although inconvenient, there is no limitation on who can remove the identification chips from current-art telephones. There are no security provisions in this regard, except for attempting to keep the device away from anyone that may be inclined to remove the identification chip. As a result, one of the drawbacks with conventional wireless phones is that the identification chips are a target for theft, because the chips can be used by the perpetrator for accessing all services within the communication infrastructure which are billed to the party associated with the identification chip.

To thwart theft or misuse, an aspect of the present invention is a method of electro-mechanically engaging the identification chip, or more preferably an enhanced phone chip which has additional functionality, within a communications device. Alternatively, the phone chip may be locked electronically, limiting the viability of a removed phone chip. Electro-mechanical locking is the preferred locking mechanism to which the descriptions herein are generally directed, however, it should be appreciated that electrical and other forms of chip locking may less preferably utilized.

The phrase enhanced phone chip will be generally utilized herein to denote an identification chip configured for the electromechanical engagement, although it may optionally provide additional memory, processing resources and the like. Insertion and removal of the identification chip or enhanced phone chip preferably requires utilizing a security key. The wireless communication devices are configured for selectively engaging and disengaging the enhanced phone chip. In this way a viable (still operational) enhanced phone chip can only be inserted or removed by an authorized individual, thereby deterring theft and preventing thieves from billing calls or ordering merchandise and services subsequent to the theft of the identification chip.

Figure 2:
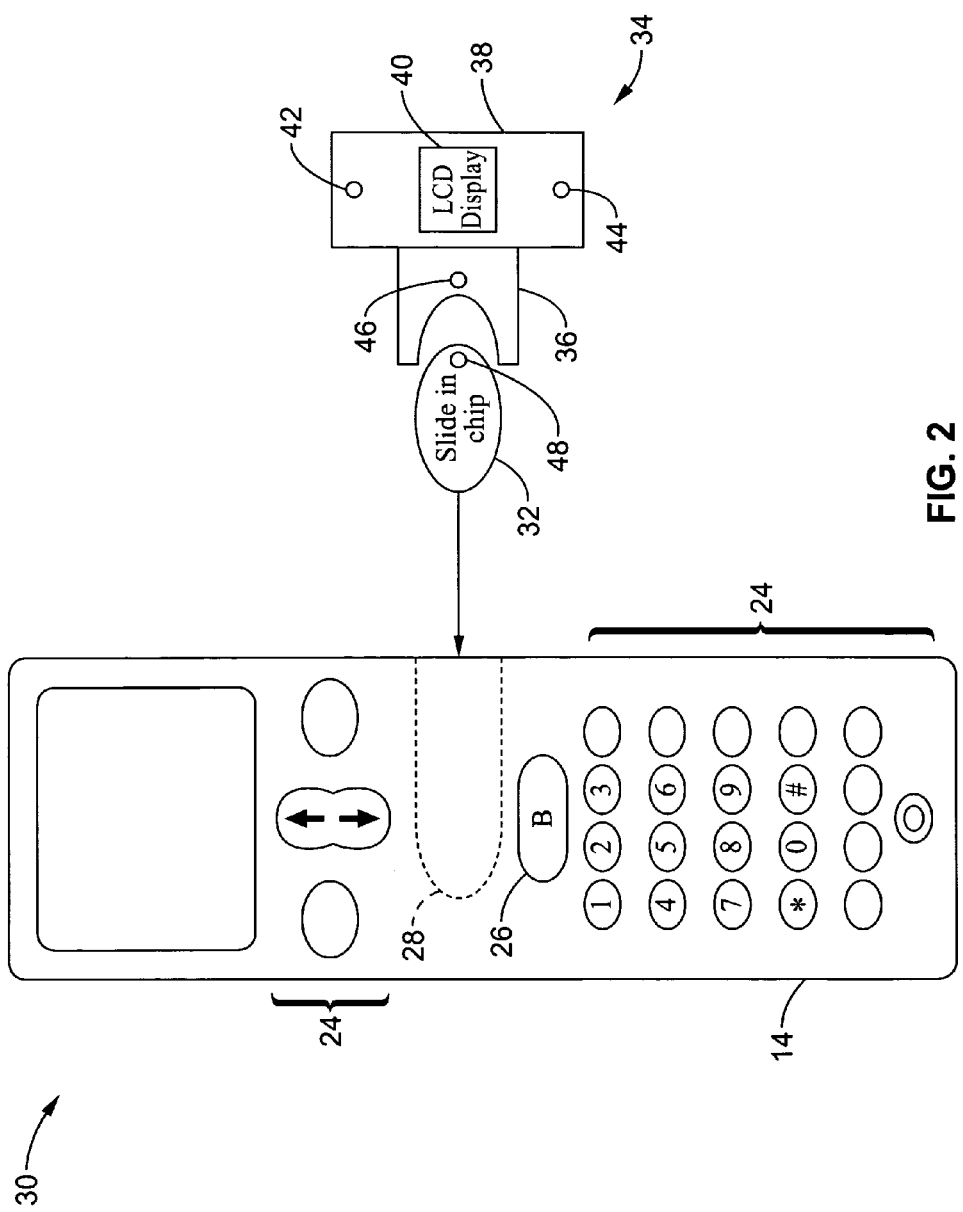
FIG. 2 is a block diagram of an enhanced phone chip according to an aspect of the present invention, shown being inserted into a communicator device by utilizing a security key.

FIG. 2 illustrates an example embodiment 30 of an enhanced phone chip 32, which can be utilized for accessing wireless networks using communication devices 14, such as cellular phones, satellite phones, other personal communication devices or base station communication devices. Enhanced phone chip 32 is shown for clarity in separation from a security key 34. An embodiment of security key 34 is shown with a holder 36, body 38 and a chip retaining means 46 which is configured to engage a retention structure 48 within enhanced phone chip 32. Security key 34 is shown having an optional display 40, along with a power activation control 42 (i.e. button) and connection control 44, (i.e. button).

Power for the enhanced phone chip 32 and security key 34 can be provided by any convenient method, such as batteries within security key 34. Alternatively, solar power, a rechargeable battery, or more preferable, a capacitor can be retained in security key 34 to provide sufficient power for displaying information when activated by the user and which can receive charging current when plugged into a slot.

The enhanced phone chip 32 is designed for use within a new form of communications device 14, such as cellular phones, satellite phones, personal digital assistants (PDAs), laptops, computers, and so forth, which are adapted for wireless connectivity. These devices may be generally referred to herein as "communicators", and one intended for the primary use by an individual, such as within a PDA or cellular phone, as the "primary communicator". Generally conventional device designs can be adapted for receiving the enhanced phone chips, preferably with the mechanical retention means described for preventing unauthorized removal of the enhanced phone chips. In one embodiment, the enhanced phone chips are inserted into the devices through easily accessible slots, such as represented by slot 28 of device 14 into which an enhanced phone chip 32 may be inserted. It should be appreciated that the form factor of the chip receptacle or slot can be shared with other modules, such as compact flash memory chips, and so forth. The chips can only be removed from a device, or inserted in another device, in response to proper validation of the user by a validation means.

The communicator devices can be configured with means for authorizing users for installing and removing enhanced phone chips. For example the embodiment of communication device 14 is shown with a user interface 24 upon which a personal identification code may be entered, and a biometric registration means depicted as a fingerprint registration device which doubles as an elongate cursor control pad.

Enhanced phone chip 32 allows a user to utilize a single account (i.e. cellular phone account, satellite account, etc) at numerous sites associated with communications, such as in a portable phone, vehicle phone, home phone, and work phone/environment. The account information is retained within enhanced phone chip 32 which upon insertion into various devices allows establishing communication connections and performing billing based on the account information. The enhanced phone chip 32 also preferably includes added memory and/or computing power which facilitates moving additional parameters, such as may be associated with a communications environment or the user, in response to moving the chip between devices.

One preferred embodiment of enhanced phone chip 32 is configured for retention by an electromechanical mechanism, such as an electro-mechanical pin, to secure the chip within communicator device 14. Device 14 is also preferably configured so that enhanced phone chip 32 can only be removed by an authorized person, such as identified by password entry, biometric identification, or more preferably by a security key means 34 that mates with, or is otherwise associated with, the enhanced phone chip. The enhanced phone chip being preferably configured to sustain sufficient damage, in response to forced removal from a communicator device, wherein further use of the identification chip for accessing a wireless network is prevented. The phone chip can be configured as mechanically frangible, electrically frangible, erasable, or configured with fusible links, and so forth; wherein either the identification information is damaged or the path between the information and a communication device is damaged.

Security key 34 is temporarily coupled to enhanced phone chip 32 and utilized for insertion and removal of enhanced phone chip 32 to and from any receiving device, such as an electronic device providing communications functionality. Device 14 illustrates the example of a cell phone or satellite phone. Enhanced phone chip 32 coupled to security key 34 is inserted into device 14 which validates that security key 34 and enhanced phone chip 32 have the proper association, such as matching security codes. In addition, in some applications, the device can verify that enhanced phone chip 32 is registered for use within the communications device. If all authorization is verified then the locking mechanism can be activated, such as by pressing a button or operating a slider on security key 34, wherein a holding means, such as a holding pin, engages enhanced phone chip 32 preventing unauthorized removal. Security key 34 may then be withdrawn. It should be recognized that embodiments of enhanced phone chip 32 may be less preferably implemented without the mechanical and/or electrical security described above.

A text and/or graphics display 40 is preferably integrated within the security key, such as for displaying information about the device within which enhanced phone chip 32 was most recently installed. This provides a textual, graphical, and/or even an audio reminder to the user as to where their enhanced phone chip, or chips, are being currently utilized. For example, the display of security key 34 may read "USTC Office Slot 325" or "JMK Primary Communicator 1" or "JMK Primary Communicator 2", where in this example USTC is a company name and JMK refers to an individual. It will be appreciated that the feedback provided by the display aids the user in readily locating the device in which the enhanced phone chip is being utilized.

It should also be appreciated that alternative means of providing information on the location of the enhanced phone chip may be utilized, such as recording a voice prompt for announcing a device name, and/or other means of informing the user. It should be noted that the display is also preferably utilized as part of a user-interface of security key 34 and can display a variety of messages. The security key can even be configured with secure storage for enhanced phone chips, wherein the user could easily transport the chips for use in different environments.

This easy in-and-out process for enhanced phone chip 32 does not require the removal of batteries or the use of other difficult procedures, and thereby can provide a significant benefit for all portable communication devices.

In one embodiment of the invention, enhanced phone chip 32 is configured in a format which can be utilized with a number of different communication services, and is not limited to analog, digital cell or GSM transmissions. Conventionally, incompatible phone chips are utilized for each form of communication service, wherein a user requires different phone chips for each service and where the devices into which the phone chips are to be inserted are engineered for receiving a particular type of phone chip. The enhanced phone chip of the present invention, by contrast, is configured as platform independent, wherein it can be adopted for cross-plafform use within a variety of communicators and even in other non-communication related devices, such as when providing secure environment information or transactional information. By having a standardized format, the same enhanced phone chip can be moved between devices which support different forms of communication, without the need of having different phone chips and thus having a separate account associated with each phone chip.

Enhanced phone chip 32 can also provide other enhanced/additional capabilities and intelligence to support the described role as well as to fulfill a contemplated expanded role. By way of example, the expanded role may comprise establishing parameters of an environment (i.e. work or home), transaction information and/or security, providing readily accessible secure storage for the user, storage of email and phone list, and so forth either separately or in combination. In this way the enhanced phone chip can be utilized as a core technology to allow users to customize their environments, such as at home, work, vehicles, and so forth.

Although shown in a carrier configuration in FIG. 2 it should be appreciated that the security key functionality may be incorporated within any small portable device, for example MP3 players, voice recorders, USB memory sticks, writing implements, and so forth. The security key can also incorporate additional security, such as including an input device for providing another level of user validation. For example, a keypad for entering a personal identification number (PIN), a biometric sensor (i.e. fingerprint, retina scan, etc.), or other mechanisms for validating the presence of the user associated with the account on the enhanced phone chip. The above enhanced security can also be integrated with the device into which the enhanced phone chip is to be inserted. In a preferred embodiment of the enhanced phone chip, the identification format is configured according to a specification which provides interoperability across the range of interconnections, wherein the same enhanced phone chips and device receiving slots are not limited to analog, digital cell or GSM transmissions, but can be registered for use on any available form of communication connectivity, or registered for use on multiple forms of connectivity.

The enhanced phone chips are encoded with the identification data necessary for accessing and routing a wireless call through the wireless network or satellite infrastructure. One embodiment of the enhanced phone chip can be implemented as the combined functionality of a SIMM+Extra Memory with Processing Power, which is referred to herein as a SEMPP chip. This SEMPP is a new form of device which preferably includes the advantages of current SIM cards with the benefits of additional memory and optional processing capability. Unlike the current art, a preferred embodiment of the inventive SEMPP chip cannot be removed from the communications device without using a mated security key.

Communicator devices according to the invention are preferably designed so that the SEMPP chip is about as easy to physically (manually) insert and remove by the authorized user as a digital camera compact flash, SD, or other digital photo media storage chips. It should be appreciated that the removal features for the SEMPP chip can be incorporated in a communicator design with or without the security key system. However, the new method of SEMPP chip insertion with a mating security key provides important benefits for portable communicators, base station communicators, and for supporting a new paradigm in communicator use in which the enhanced phone chips are shared between multiple devices allowing the user to move their communications, and preferably other aspects of their environment, from one device to another.

Traditionally, when one thinks about cellular phone use, they generally consider a small portable cellular handset that the user keeps with them during the day. However, the widespread use and ease of establishing cellular phones without the need of wired infrastructure has led to the use of cellular phones in office and home environments which traditionally couple a plurality of extension phones to one or more shared phone lines.

3. Base Stations Utilizing Enhanced Phone Chips

Figure 3:
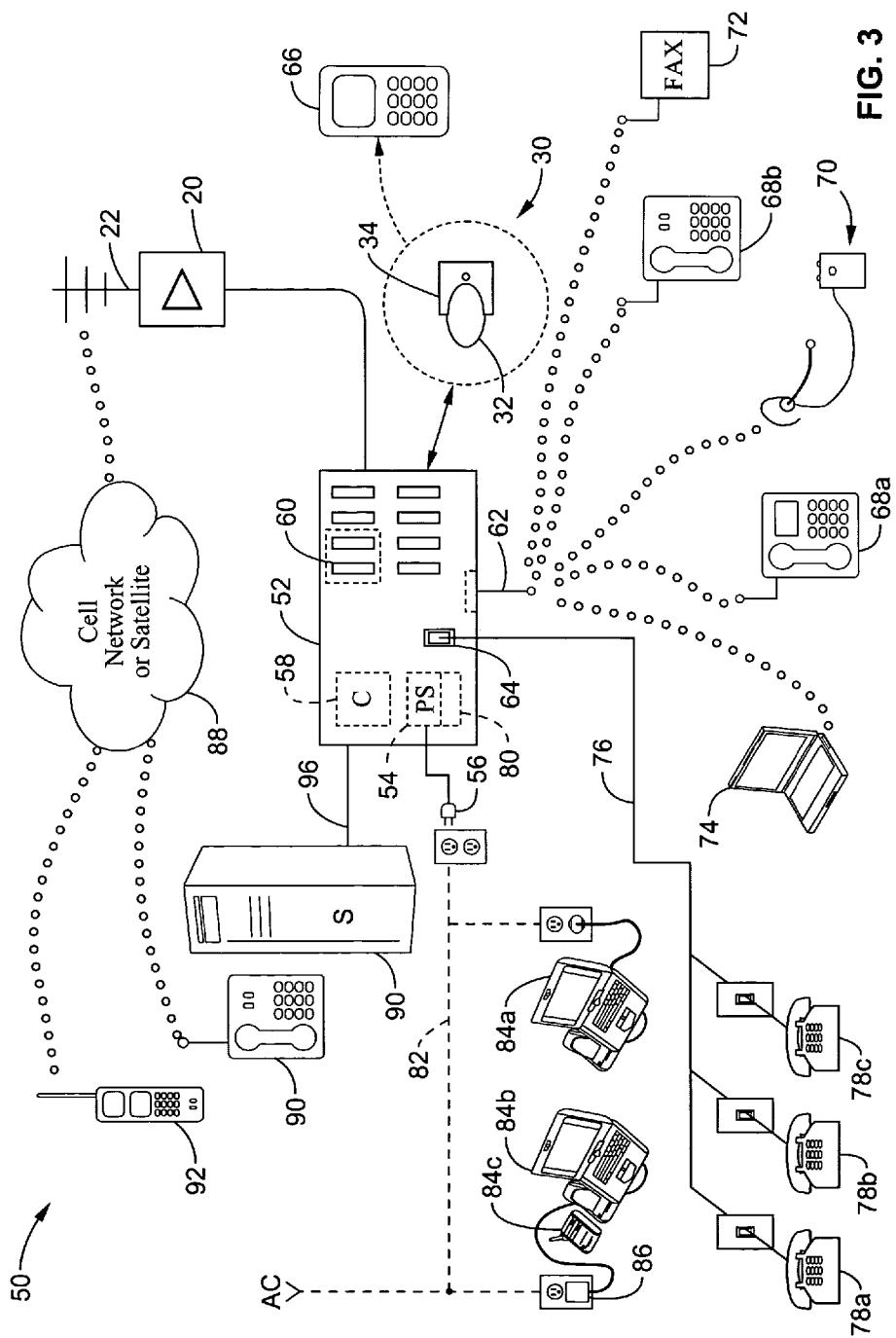
FIG. 3 is a block diagram of a wireless base station according to an aspect of the present invention, shown coupled to both wired and wireless extension phones and configured for receiving a plurality of enhanced phone chips which can be inserted using the security key.

FIG. 3 depicts an embodiment 50 of a wireless base station which can be configured to provide a completely wireless solution for deployment in both personal and business settings. A wireless base station 52 is shown having a power supply 54 which can have an internal power source and/or receive external power 56, depicted as a line cord connection to AC power, or alternatively power from an AC adapter. Circuitry within wireless base station 52 preferably includes a microcontroller or microprocessor 58 which executes firmware or software programming to controlling device functionality.

A plurality of slots 60 are depicted for receiving enhanced phone chips 32 according to other aspects of the invention. In this embodiment, phone chip 32 is shown being carried by security key 34 for insertion within any of card slots 60. Card slots 60 may be designated according to their intended use in the base station, such as for system-wide resources as shown by the dashed lines surrounding the first two slots, and slots may be associated directly with specific phone extensions on the base station. It should also be noted that enhanced phone chip 32 and security key 34 can be moved to base station 52 from other devices, such as a PDA 66 which is preferably configured with communication connectivity.

This embodiment is also depicted as having eight enhanced phone chip slots 60, however, it should be appreciated that a communications device could be configured with any number of enhanced phone chip slots (i.e. from one to many hundreds) without departing from the teachings of the present invention. Base station 52 is shown coupled to an optional amplifier 20 and external antenna 22 through which it connects to a wireless network service 88, such as a cellular phone network or satellite network, for accessing remote destinations 84, 86 (i.e. phones, FAX machines, web servers, etc.). If the network to be accessed is located sufficiently close to the base station, then the transceiver and antenna hardware may not be necessary, insofar as a transceiver and antenna are incorporated within the base station.

4. Extension Phones and Communicators

A number of devices, such as extensions, communicators, facsimile machines, and other electronic devices may be configured for communication with base station 52. Typically, extension phones are coupled to a base station for sharing access to the communication network. Phones can be coupled to the base station and/or to each other wirelessly. "Communicators" are considered herein to provide functionality beyond that of a telephone, preferably incorporating a display and keyboard capable of supporting Internet email and browsing capabilities, while it can include extended forms of interconnectivity, such as peer-to-peer communication control features.

Wireless extensions, communicators and the like preferably communicate utilizing radio frequency (RF) transmissions, by way of example and not limitation as discrete frequency, channel hopping or spread spectrum RF. However, other forms of wireless communication may be less preferably utilized such as optical, ultrasonic, magnetic near-field communication, and so forth. Wireless phone interconnectivity is depicted by phone 68*a* with display console (i.e. feature phone), phone 68*b* with limited features, a headset 70, a facsimile machine (FAX) 72, and computer 74 which all are shown communicating through a transceiver 62 of base station 52.

It should be appreciated that extension phones, 68*a*, 68*b* may comprise portable wireless phone devices, such as so-called walkie-talkies and cellular phones being operated in a local mode (walkie-talkie type mode), as well as wireless feature phones according to the invention, PDAs, laptop computers, and other devices configured for, or adapted for, wireless communication connectivity. Wireless headset 70 is shown for communicating with base station 52, although it can be less preferably configured to communication through an extension device. Wireless headset 70 is shown comprising ear bud, microphone boom and control unit, however it may be implemented in any desired configuration.

Various embodiments can be implemented which utilize local peer-to-peer wireless connectivity, such as according to the Bluetooth™ standard, or other form of communication standard. For example, when the local wireless link of a "primary communicator" comes within range of the base station (or another primary communicator), such as within perhaps about 30 feet, it will activate a connection after it has been "paired." "Paired" means that a procedure has been completed between the peers. The pairing may provide simple registration of the location of the other peer, whether accessible or non-accessible, or in the case of a base station a master-slave sort of association. A secure code lock can be activated in the process through which the paired devices securely communicate.

The "Bluetooth or other wireless pairing, or the wired connection through a cradle between the communicator devices can provide establishing networking aspects in some instances without the need to transfer the enhanced phone chip between devices. The highest levels of security being more readily provided in response to inserting a secure enhanced phone chip (i.e. SEMPP chip) between communicator devices.

Additionally, or alternatively, phone extensions can be wire-coupled to the base station, such as through either dedicated, or more preferably non-dedicated wiring. In one aspect of the invention the extensions are wire-coupled to one another and the base station over dedicated lines (i.e. conventional telephone lines or network cabling), such as shown by phones 78*a*–78*c* over dedicated wiring 76 to at least one wiring jack 64.

Additionally, or alternatively, the extensions can be wire coupled over non-dedicated lines, such as utilizing superposition techniques for communicating over existing AC power lines connections. Interconnectivity is shown utilizing AC wiring 82 which can support internal communication between numerous extension devices. Base station 52 is shown having a power supply 54 which is configured with an AC line communications interface 80 for communicating over AC line 82. The AC line typically comprises wiring which connects to a power distribution infrastructure, such as coupled to a power plant and power distribution grid spanning a large geographic area. However, AC power can be supplied from local generators, or sources of DC power (i.e. batteries, solar panels, windmills, fuel cells, and the like) which are coupled to power inverters to render an AC output. It should also be appreciated that the invention can also be configured to provide communication over a distributed DC power bus, although DC power distribution is less efficient over distance and is typically less compatible with existing equipment being powered.

The use of non-dedicated wiring for internal communication is exemplified by base station 52 connecting through connection 56, as well as other communication devices, exemplified by a communicator 84*a*, and communicator 84*b* operably coupled to a cradle for connecting with a separate wireless handset 84*c*. Communicator 84*a* draws power from the AC line 82 which also serves to provide internal connectivity. Power and internal connectivity for communicator 84*b*, 84*c* are provided through an AC adapter connecting to the AC power line 82. This aspect of the invention coupled with the use of wireless external connectivity, such as through base station 52, utilizing external wireless interconnectivity from each separate extension, or a combination approach, allows readily establishing a complete multi-party work environment without the need of dedicated communication wiring.

The communication between extensions, and preferably at least one base station, can allow for the interconnection of a number of parties, which can share one or more wireless "outside lines". Each of the phone devices shown in the figure can access the external communications network for sending or receiving calls. It should be appreciated that the system would more typically connect with the extensions through one or two of the approaches outlined, although applications can arise in which all internal communication techniques are employed.

Although the group functionality is generally described as being provided through base station 52, it should be appreciated that these group related functions can also be provided in a peer-to-peer mode. Communicator 84b, 84c for example is configured with its own cradle and cellular phone wherein it can directly execute external communications utilizing the wireless network 88 without the need of base station 52. Furthermore, other communicators, such as communicator 84a may integrate partial (i.e. phone chip but no transmission facilities) or full (phone chip, wireless transceiver, and antenna) wireless network connectivity. Communicators equipped with microphones and cameras, such as positioned above the display screen, provide hands-free talk modes as well as teleconferencing capability within the system.

It should also be recognized that the phone and communicator connectivity is not provided over satellite or cable television infrastructures. This has the advantage of allowing the users to freely talk and view wireless cable or satellite television without impact on the phone traffic of the system. For example, communicators 84a, 84b are shown configured with screens, which in combination with optional television receiver circuits (i.e. broadcast, satellite or cable) that provides the user with audio and video access to television. In a similar manner, radio broadcasts can be accessed by communicators to which a radio receiver is integrated or coupled.

It should be generally appreciated that connectivity with the system can also be established in a number of forms including, but not limited to, the following: (a) cord connectivity between communicators (i.e. base unit to cell phone primary communicator); (b) cord connectivity from a first communicator to a second communicator engaged in a cradle (i.e. vehicular base station having a cradle for receiving a cellular phone communicator); (c) AC line signal connectivity between communicators, at least one of which provides external wireless connectivity; (d) a communicator (preferably base station) having an integrated cradle; (e) an extension phone having functionality for extending the features of a communicator received within a cradle; (f) infrared communication connectivity between communicators; (g) transferable enhanced phone chip between communicators with or without the electro-mechanical locking mechanism. It should therefore be appreciated that aspects of the inventive system and methods utilize numerous types of connectivity.

5. Group Related Functionality

The group related functionality is particularly well suited for use within organizational and business settings, wherein an extension can locally connect to one or more of the other extensions without accessing the external communications network. Base station 52 thus provides access from any of the extension phones to each other and to remote destinations accessed by the use of valid identification code(s) within an enhanced phone chip for establishing connectivity with a wireless network.

Base station 52 can provide interconnection of internal lines and the connection of one or more internal lines with outside lines which are functions normally associated with a feature phone system or private branch exchange (PBX). In addition, optional functionality such as voice mail, call forwarding, auto-attendant, call screening, and so forth can be integrated within the functionality of base station 52. It should be appreciated, therefore, that any desired PBX related functionality can be incorporated within base station 52 without departing from the present invention. Implementation details of PBX-like interconnection aspects of base station 52 are not described herein, as these would be known to those of ordinary skill in the art of designing PBX phone systems.

Base station 52 is also preferably configured for communicating non-voice information through the wireless network 88. The wireless network may for example comprise a cellular or satellite network, or a separate wirelessly accessed service. In one embodiment wireless network 88 can be accessed by computer 74 for sending and receiving email as well as for browsing the world wide web, uploading and downloading. In this way all business related information services which are performed within fully wired environments can be provided herein.

6. Enhanced Phone Chip Use with Group Functionality

Base station 52 can be configured for manually or automatically adapting to the work pattern of the user associated with the inserted enhanced phone chip. For example, enabling certain phones for use by the individual at different locations within the business, or utilizing user selected ring tones to direct a call to a specific individual. For example, an incoming call is received in which the extension number of an intended recipient is received. The system looks up the location of the user and their selected ring tones and directs the call to that extension, or extensions. The location of the user can be based on their preferences, their manual input, or in relation to a system, such as smart badge based, which maintains positioning information for each user allowing selective routing. It should be appreciated that business compatible systems such as these providing cellular network or satellite-based connectivity can provide a further wealth of features and capabilities to assist in the business environment.

Furthermore, one or more optional computers, such as server 94, can be coupled to base station 52, preferably using a wired connection 96, although a wireless connection can be established. Server 94 can provide network resources for use by base station 52 and all devices coupled through base station 52. For example, an intranet may be established through base station 52. Application programming over the intranet can be hosted, or served, from server 94, and databases or other data can be stored on the server for the enterprise wherein the maintenance of individual copies at each station (extension) is not required.

According to one aspect of the invention, writable system or personal data is retained in the enhanced phone chips which are inserted into slots 60 of base station 52 to set operating parameters for the server and its applications thereby establishing a consistent environment for an individual working from a device having connectivity from the base station. By way of example a login password, a contact list, an email account, application settings, group connectivity, a to-do list, personal and business documents and so forth can all be retained within enhanced phone chip 32.

Base station 52 may be alternatively implemented as a computer peripheral, wherein the functionality of computer 58 may be executed by a computer system, such as computer 94, which executes a base station application. It should be realized that computer 94 may comprise a conventional personal computer, a work station computer, a computer server, laptop computer, or other embedded or general purpose computers configured with programming for controlling base station 52.

In one mode of the invention as each slot 60 of base station 52 is populated with an enhanced phone chip another "outside line" is made accessible through base station 52 by any of the extensions. However, other modes of the invention allow outside lines associated with an inserted enhanced phone card to be accessed only by selected extensions, or to only allow other aspects of the enhanced phone chip to be selectively accessed such as parameters, contact lists, and so forth.

The group functionality described above can also be implemented within an extension or more preferably a communicator device, although typically these would be configured for controlling fewer extension and/or group related functionality. It should be readily apparent that the base station configuration shown in FIG. 3 allows establishing a work or home communications environment between a number of different extensions, which can also be considered satellite extensions.

7. Alternate Embodiment of Enhanced Phone Chip

Figure 4:
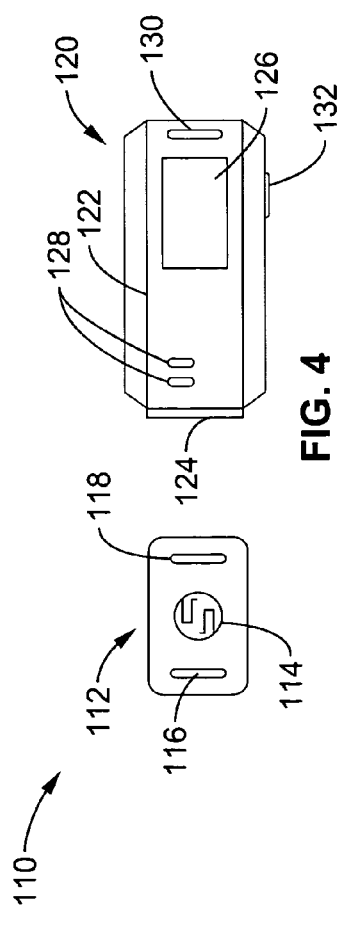
FIG. 4 is a perspective view of an enhanced phone chip and carrier device according to an embodiment of the present invention, showing enhanced phone chip prior to retention by chip carrier.

FIG. 4 depicts an enhanced phone chip and carrier embodiment 110. An enhanced phone chip 112 is shown configured with memory 114 and configured with retention structures 116, 118, wherein the device can only be removed by utilizing a properly coded carrier device 120, or a carrier device upon which the owner identifies themselves (i.e. PIN, fingerprint, voiceprint or other biometric element).

It is contemplated that chip carrier 120 would be typically configured for retaining a single enhanced phone chip, however, it should be appreciated that it can be alternatively configured for retaining two or more enhanced phone chips (i.e. dispensing chips from each end, from a stack arrangement, a LIFO or FIFO arrangement, and so forth). With multiple phone chips, chip carrier 120 can be utilized for populating multiple devices with wireless connectivity, memory, user parameters, and so forth, while providing a measure of redundancy.

If the chip carrier is configured for retaining multiple enhanced phone chips then it preferably is configured to allow keeping the data on the multiple chips synchronized while they are retained in the security key, in this way the user need not worry about which chip has the most recent parameters.

Chip carrier 120 is shown configured with a housing 122, a chip receiver 124 and typically supports some form of user interface. In a simple mode the user interface can be simple control for releasing the chip from the carrier. In more sophisticated embodiments the user interface can comprise multiple input and output elements. In the present embodiment a display 126 is shown with status indicators 128 (i.e. LEDs), with additional user input controls 130, 132, such as buttons, slide controls, and so forth.

The chip carrier may be configured to provide additional functionality as well as being a carrier for removing and installing the enhanced phone chip into different devices. For example, chip carrier 120 can be configured with internal memory and an interface to allow the user to store additional information within the chip carrier even when the enhanced phone chip with its internal memory is not attached. This chip carrier for example may be configured for retaining other user information files and so forth. It can include additional input elements, such as a microphone, and provide outputs such as a speaker or audio jack. The device can thus be configured to support functionality for file storage, controlling transaction execution, audio recording, audio playback (i.e. MP3), or even camera based functionality. it should be appreciated that by integrating the chip holder with these additional aspects that the user is then required to keep track of fewer devices.

8. Communicator Embodiment

Figure 5:
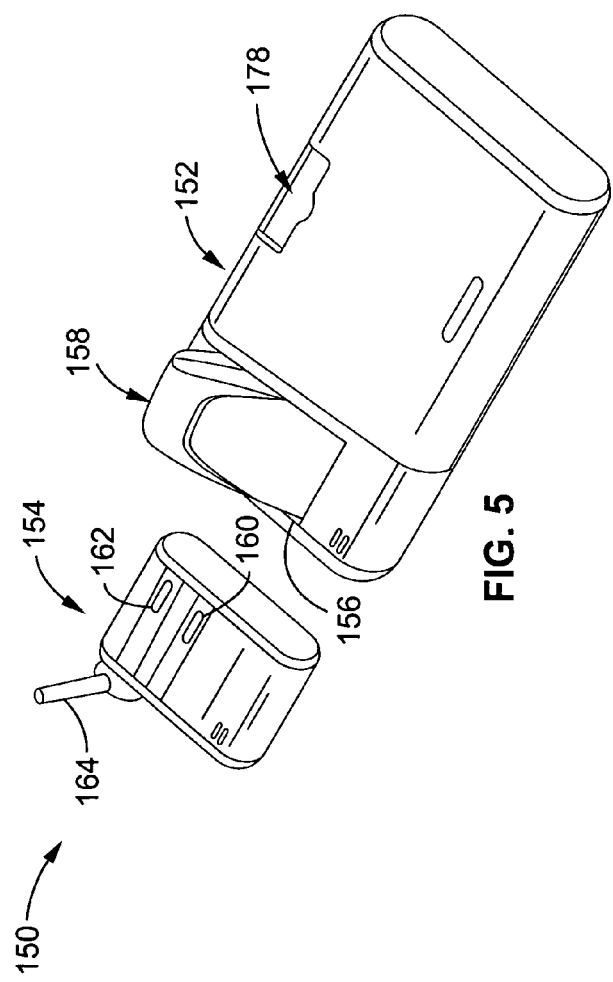
FIG. 5 is a perspective view of a base station and communicator according to an embodiment of the present invention, showing the communicator in the closed position.
Figure 6:
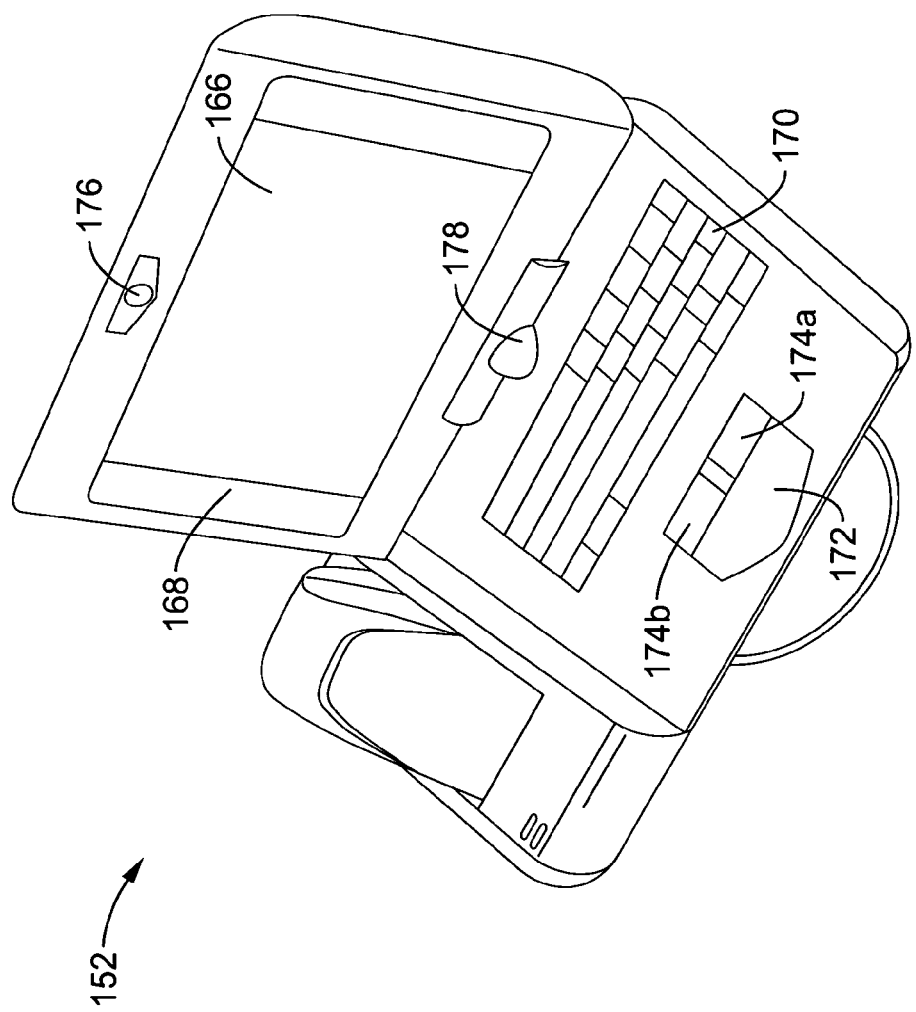
FIG. 6 is a perspective view of the communicator of FIG. 5 shown in the open position with display and keyboard.

FIG. 5 and FIG. 6 depict a system embodiment 150 having a communicator device 152 and a small two-slot base station 154. Communicator 152 is shown having an optional docking station 156 into which a cellular phone 158 has been received. Cellular phone 158 may be configured according to the present invention for receiving the enhanced phone chip, or it may be a conventional cellular phone from which the phone chip can not be readily moved to a base station. Communicator 152 and base station 154 can be powered using any convenient mechanisms, including external power sources, such as AC line input, power from AC adapters, solar power, inductively coupled power, fuel cells, batteries, and assorted other power forms and combinations thereof.

Base station 154 is shown with slots 160, 162 which are configured for receiving and mechanically engaging an enhanced phone chip 112. An antenna 164 is shown for establishing wireless communication, such as with a wireless cellular network infrastructure. The base station 154 is also configured for establishing local connections to user devices, such as communicator 152. It will be appreciated that although base station 154 is particularly well-suited for wirelessly communicating with communicator 152 (i.e. Bluetooth™ standard, etc.) it may also be less preferably configured for AC power line communication, or for telephone line wired connections.

In one mode or embodiment of the invention, communicator 152 communicates through base station 154 in order to obtain a wireless connection using one of the enhanced phone chips to the network infrastructure. In this instance the enhanced phone chip may have been extracted from phone 158 and inserted into base station 154, or the base station may contain one or two other enhanced phone chips. In another mode communicator 152 can access the wireless network infrastructure through a cellular phone 158 retained in docking station 156, insofar as the enhanced phone chip for that phone has not been removed. Furthermore, communicator 152 can be configured for performing peer-to-peer communication wherein the communicators can be utilized as phone extensions. Cellular phones having enhanced phone chips can then be utilized within the peer-to-peer communication if permission is granted from the communicator containing the cellular phone to be utilized for the wireless network connection.

Communicator 152 is shown in an open configuration in FIG. 6 exposing a user interface which is more comprehensive than the user interface of cellular phone 158. By way of example, the enhanced user interface is depicted with a display screen 166 (i.e. LCD, OLED, EL, VF, eInk, etc.), speakers 168 (i.e. monaural sound, stereo sound, surround sound, THX, etc.), keyboard 170, track pad 172, and right and left select buttons 174a, 174b. Other forms of input and output may be additionally or alternatively provided, such as camera 176. Display screen 166 may be adapted for swiveling on hinge 178 in either single or two axis modes. Utilizing a two axis hinge provides the option of orienting the display toward the exterior of the device. A touch sensitive form of display then can allow the user to perform many interactive operations without opening the clamshell to access the keyboard or cursor control device.

Communicator 152 preferably is configured for expanding the utility, and or memory storage of an enhanced phone chip within cell phone 158 as retained in docking station 156, or within base station 154. The user can access the data retained in the phone and use it through the communicator. For example, the user can access and edit contact lists, documents, and other materials retained within the memory of the enhanced phone chip. It should be appreciated that the amount of memory retained in the enhanced phone chip may be selected by the user at the time of purchase, wherein they can decide the amount of memory they wish to purchase within the enhanced phone chip. Currently, the amount of memory integrated within USB "key-fob" memory devices being sold ranges from approximately 16 MB to 1 GB, and is expected to continue increasing. It will be appreciated that the enhanced phone chip can be configured with different levels of storage based on user needs.

9. Wireless Internal Connectivity Example

Figure 7:
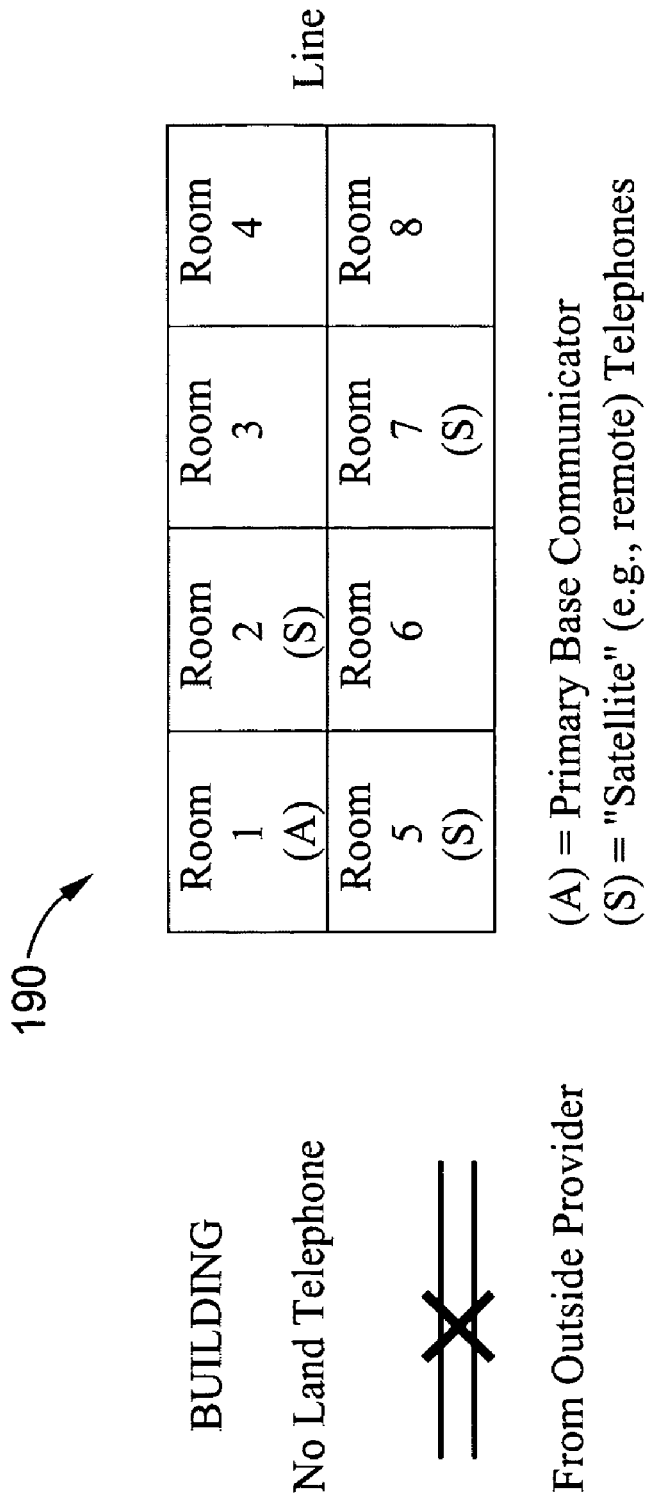
FIG. 7 is a block diagram of deploying a wireless base station according to an embodiment of the present invention, within areas or rooms of a building, or cubicles within a large room.

FIG. 7 depicts an example of using a wireless base station according to the invention for establishing an organizational presence within a building 190 shown with Room 1 through Room 8 (or cubicles), none of which are coupled to a wired telephone infrastructure. A base station (A) is shown setup in Room 1, which provides wireless connectivity with satellite extensions (S) in Room 2, Room 5 and Room 7. The system allows a group communication environment to be readily established without the need of any wired telephone infrastructure, either within the building or in connecting with a telephone carrier.

Alternatively, if building 190 is configured with an AC power distribution network, then internal communications can be provided by way of superposition of signals on the AC line between stations and the base station, or in a peer-to-peer mode between stations.

In either case the need for pre-wiring a site for communication is eliminated. For example the invention eliminates the necessity of performing an expensive process of routing telephone wiring between extensions in order to support group related internal interconnectivity with remote access capability. The benefits of the present approach are numerous and include lowered installation costs, no location constrictions (i.e. unrestricted movement of extensions, communicators, and base station as desired), while reliability can be increased because less opportunity exists for wiring to be damaged.

10. Enhanced Phone Chip Utilization

Figure 8:
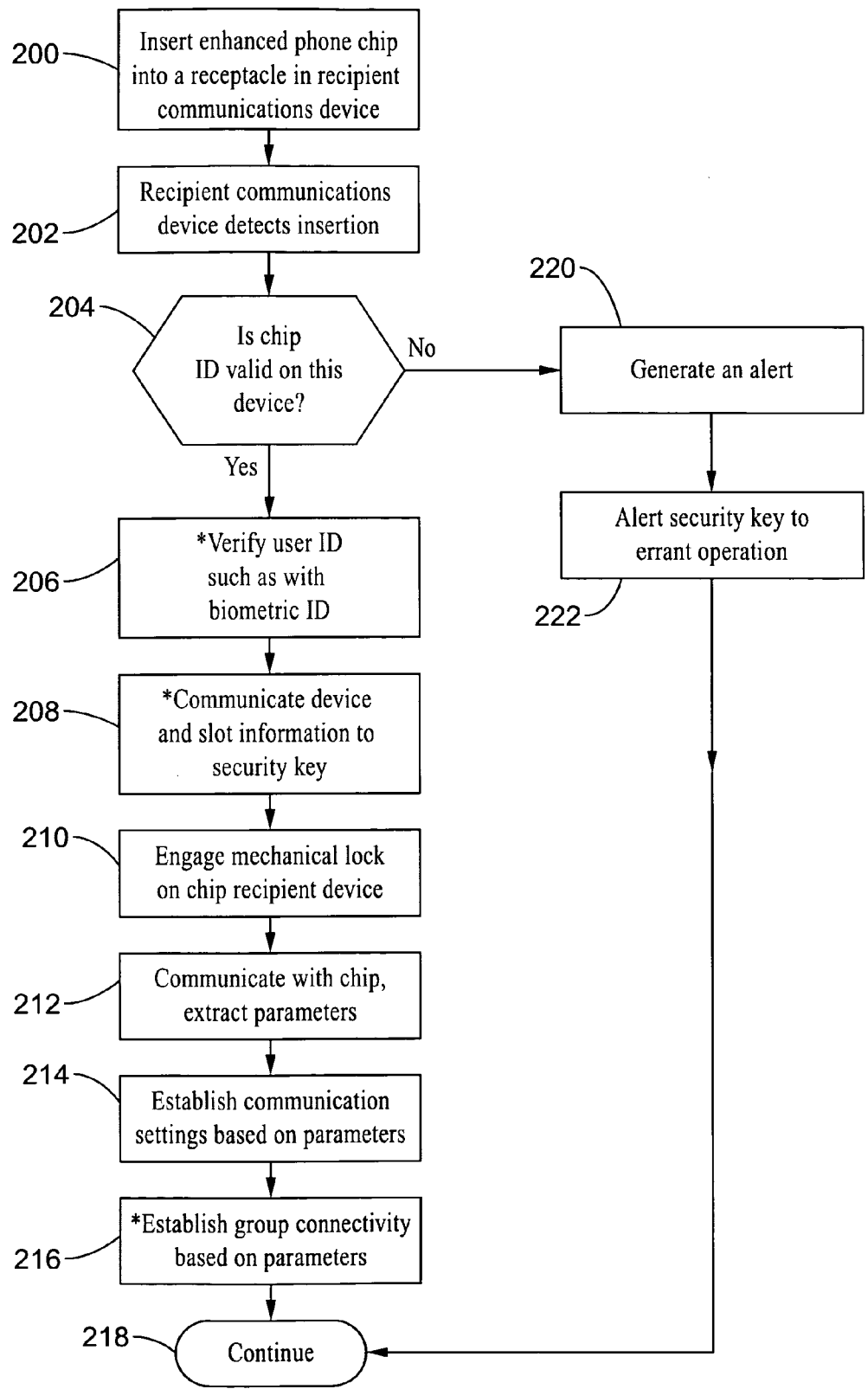
FIG. 8 is a flowchart of inserting an enhanced phone chip into a recipient device according to an embodiment of the present invention.
Figure 9:
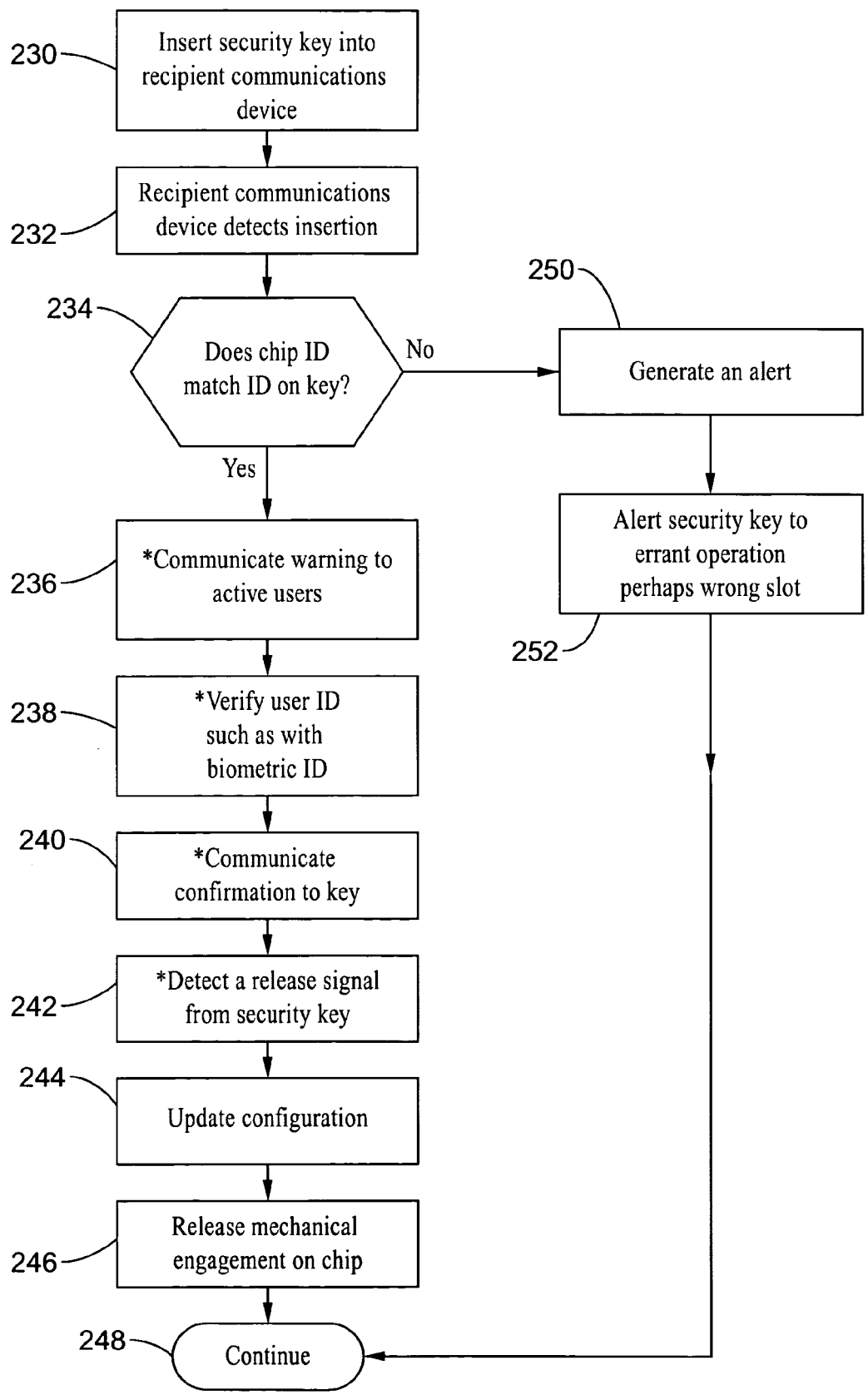
FIG. 9 is a flowchart of removing an enhanced phone chip from a recipient device according to an embodiment of the present invention.

FIG. 8 and FIG. 9 describe the method of inserting and removing an enhanced phone chip from a communications device according to an embodiment of the invention. It should be realized that the flow and functions depicted can be modified by one of ordinary skill in the art without departing from the teachings of the present invention. Some important elements of the programming executable in a device, such as a communications device (i.e. cellar phone, PDA, base station, and so forth) equipped for receiving an enhanced phone chip is shown in the flowcharts.

In block 200 of FIG. 8 the enhanced phone chip, preferably attached to the security key, is received within the communications device, as detected at block 202. A check is performed at block 204 to determine if the enhanced phone chip should be allowed to operate in the device. This aspect of the invention can be used for limiting who may insert their enhanced phone chip to utilize the device. For example, enhanced phone chips can be registered for utilizing the device, such as registering the enhanced phone chips of all users within an organization. Preferably, the correspondence between the security key and enhanced phone chip is also verified, thus the installation of phone chips is prevented when a mismatch arises between the phone chip and the security key. In this way access to the resources of the system are made secure. If the identification of the enhanced phone chip being inserted into the base station is invalid, then an alert is preferably generated as represented by block 220, such as generating audible alerts and providing notifications as desired to select parties. The security key associated with the enhanced phone chip is preferably sent an error message as shown in block 222, which for example may be displayed to alert the user to the problem.

Upon verifying the "registration" of the enhanced phone chip additional security measures can be invoked, one of which is represented by optional block 206 at which a biometric ID, or alternatively a personal identification code, is received and compared against known biometric data stored in device memory. It should be appreciated that alternative forms of extended security may be utilized, such as requiring the entry of a personal identification number, or other form of identifier.

Once it is established that the enhanced phone chip is cleared for operation on the communications device, information about the communications device and the slot into which the enhanced phone chip have been inserted are preferably communicated to the security key as per block 208. In this way the security key can retain, and preferably display, information about which device the enhanced phone chip was last installed. The enhanced phone chip is then engaged by the device with a mechanical locking means as shown in block 210, this may first require disengagement from the security key if the security key itself is configured for mechanical locking retention of the enhanced phone chip. Once the enhanced phone chip is connected to the recipient device then operational parameters are extracted from the chip as per block 212 determining the relationship between the recipient device and the chip. In block 214 the communications settings for the recipient device are established in response to the extracted parameters.

It should also be appreciated that the mode of operation (i.e. how the represented resources are used) for the enhanced phone chip may be determined in response to which slot of the recipient device the chip is inserted. For example, a portion of the slots may be marked as system-wide slots, wherein the resources associated with enhanced phone chips inserted in these slots are shared across the system. In contrast the other slots may be configured to associate the resources with one or more given extensions coupled to the base station.

The relationships between the different enhanced phone chips retained in the recipient device is then preferably checked and the desired connectivity established in response. For example, users working on a given project may be considered a group, wherein the recipient device can automatically alert those in the group of the presence of those in the group and establish group-based functionality as per block 216 in response to enhanced phone chip insertion or removal by any members of the group. The recipient device continues as per block 218 to control connectivity and the insertion and removal of enhanced phone chips.

Removal of an enhanced phone chip from the recipient device follows a similar process which is outlined in FIG. 9. According to this embodiment, a matching security key must be inserted as per block 230 in order to release the enhanced phone chip associated with that security key. The recipient device detects the insertion of the security key as per block 232 and determines if the identification of the security key matches that of the enhanced phone chip as per block 234. It should be noted that a one-to-one relationship need not exist between security key and enhanced phone chip, as this would require an individual with multiple enhanced phone chips to retain multiple security keys. Therefore, it is preferable that one-to-many or many-to-one relationships be supported according to certain embodiments of the invention.

If the security key doesn't match the enhanced phone chip, then an alert is generated as per block 250, and the security key itself can be notified for generating a user alert as per block 252. In some instances, such as if the identification of the inserted security key is not recognized as belonging to any registered persons, then a wider alert can be generated to the party associated with the enhanced phone chip, to a system administrator, system-wide, or according to any established alert protocols established for the system.

Prior to allowing the removal of an enhanced phone chip any users on the system which are using resources associated with that slot are preferably warned as per block 236 (optional aspect). For example, a user may be in the middle of a long-distance phone call which utilizes the account of the enhanced phone chip. The warning is preferably also communicated to the individual trying to remove the enhanced phone chip, wherein they are aware of the resource use associated with that chip prior to its removal.

Optionally, enhanced security can be required, as per block 238, such as requiring the entry of a personal identification number/code (PIN) at the recipient device, a biometric identification, or other form of identification. This extra security prevents Party A from using a security key stolen from Party B to retrieve the enhanced phone chip of Party B for their own use. Once the security key, and optionally user, are confirmed then a message can be sent to the security key as shown in block 240 (optional aspect) to acknowledge access. This signal preferably arms the release button on the security key and alerts the user that they can now retrieve the enhanced phone chip. The recipient device optionally detects a release signal from the security key in block 242 (optional aspect), it then updates its configuration as per block 244 based on a removed state of the enhanced phone chip, and releases its mechanical engagement on the enhanced phone chip as per block 246, wherein it may be retrieved by the security key. If the security key provides its own chip engagement mechanism then it will be activated subsequent to the release by the recipient device. The recipient device then continues to operate as per block 248 without the removed enhanced phone chip.

11. Outline of Select Inventive Aspects

Figure 10A:
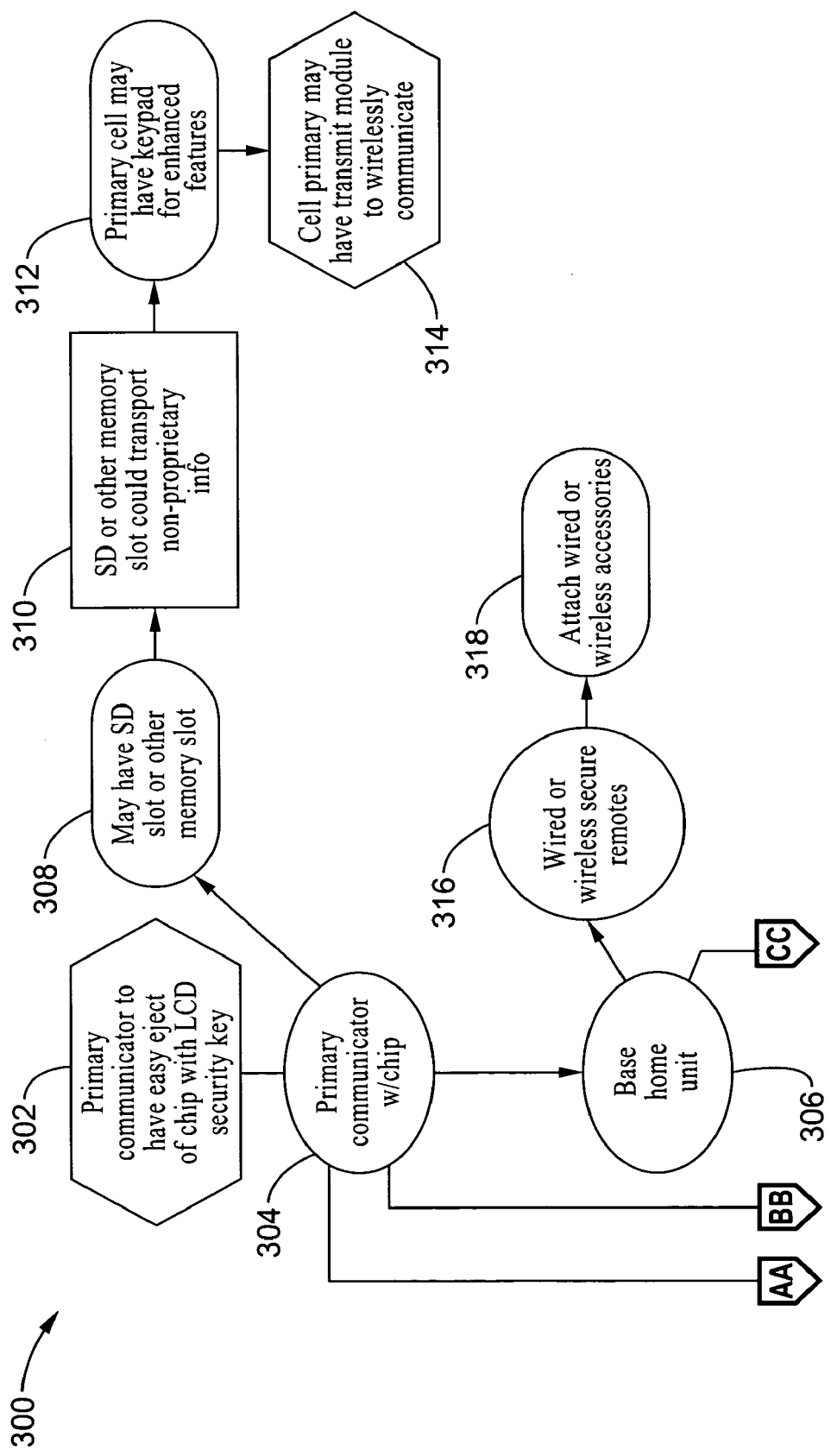
FIGS. 10A–10B is a functional schema depicting by example aspects of the present invention, shown in relation to one another.
Figure 10B:
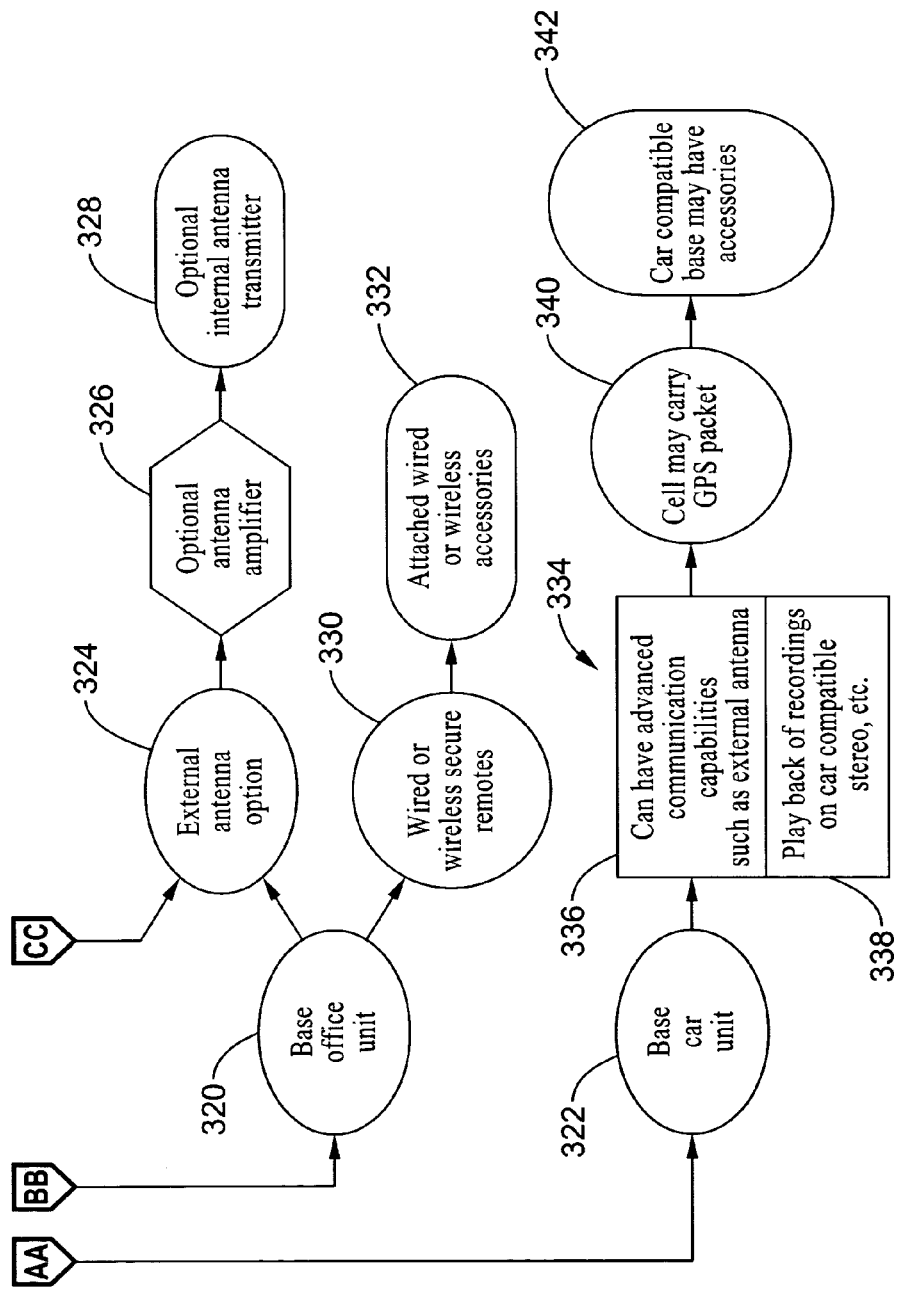

FIGS. 10A and 10B outline a number of aspects 300 of the invention and their general relationship. In FIG. 10A a recipient device, which can be a primary communicator, is preferably configured as in block 302 with an easily removable enhanced phone chip, such as inserted and removed using the security key. The primary communicator in block 304, and base unit 306 may have SD slots or other means of engaging the enhanced phone chip as per block 308 which can contain both proprietary data such as account identification and security, as well as non-proprietary information as per block 310. The primary communicator can be configured as per block 312 with I/O devices, such as keypad input. The primary communicator as indicated in block 314 can be configured for establishing wireless communication, such as via a wireless network, or a peer-to-peer form of connectivity.

The primary communicator would typically comprise a personal digital assistant (PDA), cellular phone, or other device which is the primary electronic interface of the user associated with the enhanced phone chip. The primary communicator may be configured with any desired functionality, by way of example and not limitation including computational, voice and image recording, image and audio output, security verification (i.e. keypads for PIN, biometric, etc.), file storage (i.e. data, audio, image), printing, transactional resources (i.e. financial transaction applications and encryption/decryption), global positioning (GPS), and any desired user inputs (i.e. keys, pointer device, scroll pad, pen motion receiver, voice recognition, etc.).

It is contemplated that users would have an enhanced phone chip that is associated with their own primary communicator, which can be removed from the primary communicator and inserted for use within other recipient devices, such as within the wireless base station exemplified in FIG. 3, or a base station in the home or within one of the vehicles used by the individual.

It is expected that communicator devices would be issued by authorized FCC or international wireless carriers wherein each primary communicator sold would come with an associated security key and enhanced phone chip. The enhanced phone chip and security key being coded to match, or correspond, with one another, and registered on the primary communicator, which can provide device use in response to the insertion of a single registered chip, or a registered chip within a group of registered chips.

It is contemplated that some individuals may have multiple primary communicators depending on their activities. For example an individual may have a primary communicator for business and social use and a waterproof communicator for use at sporting events, such as sailing and other water sport events. They may have primary communicators of differing sizes or with different capabilities, such as having one device which is miniature and another device having a "QWERTY" keypad for business usage for easily sending emails or text messages with ease during the business week.

A base or home unit is shown in block 306 which provides for wired or wireless remote "extensions" as per block 316 that are preferably secure. It will be appreciated that all data and voice communication between remotes and base stations can be optionally scrambled or encrypted to assure secure transmissions. Wired or wireless accessories can be attached to the system as per block 318.

A base unit in a home environment may be configured to receive multiple enhanced phone chips, such as one slot for each person in the home as well as guest slots. These slots can be assigned for specific purposes or individuals as desired. The services provided by the system being established by the system administrator (i.e. parents) based on the identity of the users. Outgoing call destinations can be controlled based on user identification, while the time of both incoming and outgoing calls can be logged and/or controlled. In addition, it is contemplated that the base station can control internet access and the execution of financial transactions.

It is preferred in each of the embodiments described, that once the enhanced phone chip is removed from the primary communicator, that the communicator device can still be utilized for every other inherent function which does not require the enhanced phone chip. It is preferred, for example, that wireless peer-to-peer connectivity, such as provided according to the Bluetooth standard or other convention within the communicator, be enabled for communicating between the primary communicator and the base station, or between various communicators. This allows the base station to provide enhanced capability as desired for the primary communicator.

It should be appreciated that the wireless connectivity of the home base unit provides enhanced security as wires cannot be cut, for example to defeat an alarm system. The ability to position the remote extensions without wiring constraints provides significant convenience benefits. These innovations can reduce labor and material costs for both new and existing residential and commercial structures.

In FIG. 10B a base office unit at block 320 is shown along with a base car unit at block 322. The base office unit is shown having an external antenna option 324, amplifier 326, and transmitter 328, which are options shared with home base unit 306. Wired or wireless remotes can be connected over a secure connection as per block 330 and accessories may be coupled to the base office unit as per block 332 with wired or wireless connections.

In a multi-slot recipient device, such as a typical business base station, each slot can be configured to generate identifiers to inserted security keys. For example, upon John Doe arriving at work, he can remove his enhanced phone chip from his primary communicator using the associated security key and insert the device into a base station at the place of employment. Various organizations can provide guest slots allowing the user to insert their enhanced phone chip for gaining access to services at that location, which are provided free or billed to the user.

Once inserted, the enhanced phone chip is retained by a mechanism preventing others besides John Doe from removing the enhanced phone chip. A call log and any resources utilized by John Doe in association with his inserted enhanced phone chip can be registered by the recipient base station system. The base station can also register the times of arrival and leaving of the individual, thus possibly eliminating the need of other time tracking devices. Calls to an individual can be routed to them and marked visually or audibly for receipt by a given individual. For example, each user could have their own harmonic ring tone and/or a voiced annunciation such as "Jim you have a call from ABC Corporation (i.e. based on caller ID info).

The use of the enhanced phone chips according to this invention can be extended in the business environment to allow controlling of machinery for an individual in response to their identification, the setting being stored in the chip and/or in the system in response to the user identification. For example, storing the operational characteristics or access to metalworking machinery, sewing machines, and other devices which don't have communication capability.

A base car unit in block 322 is also depicted which may be configured with options at block 334 such as external antenna 336 and the control of various vehicle systems as in block 338, such as moving map displays, audio systems, climate control, seating, automated calling features, and other aspects of the vehicle which can be controlled or personalized by the enhanced phone chip. It should be appreciated that the automotive base unit 322 is preferably coupled to GPS functionality as per block 340 which can provide location based calling services, emergency 911 calling, and other services and that the vehicle base station may be connected with additional accessories as per block 342.

By way of further example, features of the vehicular base station may include advanced hands-free phone operating controls, large color display screen, full-sized QWERTY keypad, still and video digital cameras, stereo or surround sound speakers, moving map displays, climate control, ergonomic controls, and so forth. The system may be configured with an extended antenna for increasing the calling range. The base station may be controlled by a large touch screen or voice driven prompts. The automotive base station may be configured to dock with the entire primary communicator device, wherein the enhanced phone chip need not be removed from the primary communicator; and which also allows utilizing some functionality of the primary communicator, preferably using the enhanced hands free input and large display (i.e. heads-up display, moving map display, or other output).

In residential and commercial systems, base and remote communicators may utilize unique audio and visual indicators to distinguish from line-to-line. This perhaps is most applicable in a home or small office having multiple lines, such as between two to twenty.

12. Outline of Select System Attributes

By way of example, utilization of the enhanced phone chip according to an embodiment of the invention can have the following attributes.

1. A service provider such as AT&T® sells a customer a cellular or satellite telephone system now to be called a "primary communicator."

2. A customer security key is provided with an embedded code.

3. AT&T® or other provider encodes the enhanced phone chip with a mating code.

4. The phone chip cannot be inserted into the cellular device without a compatible embedded code.

5. The security key mates with the enhanced phone chip containing random access memory (i.e. an amount selected based on cost).

6. The phone chip is then inserted in the communicator through a side or surface slot. No battery or communicator disassembly is required to access the cell slot.

7. Once user inserts the chip using the security key the user presses the electromechanical lock key which engages an electro-mechanical locking means, such as a pin, which secures the chip in place so no one can reuse it without the inserting the mated security key.

8. At or near the time when the locking mechanism activates, the security key reads the identifier for the communicator (i.e. cellular or satellite phone/PDA/etc.) which is stored in the security key and can be briefly displayed on the recipient device and/or the communicator to assure the user is made aware of the designation of the recipient device. For example a designation may comprise "JMK Nokia 6800 Cell Phone." If a user should have multiple keys, they can selectively display the last communication device each was inserted into, such as in response to toggling of the power activator.

9. The enhanced phone chip can be removed from the primary communicator using the security key and then inserted into a base station for use in a home, office, vehicular or remote location.

10. Upon locking the unit into a base station or communicator, the pre-programmed base identifier is displayed on a display (i.e. LCD or electronic ink display), for example: "JMK Resident Slot 1."

11. A business system that has a 100-cell capacity may display something like "United States Product Development Slot 73."

12. User activation of office communication equipment with a given enhanced phone chip can provide activation of one or more wired or wireless cell or satellite systems.

13. However, if the security key is not valid, the locking mechanism will not allow locking or access to services within the system.

14. The security key will be disabled and not allow the electro-mechanical pin to activate if the chip is not registered and recognized.

15. If a non-registered chip is placed in a business system, then a security alarm could be activated providing visual, audible, or other form of alert or combination of alerts.

The present invention provides numerous beneficial aspects for fostering wireless communications between parties. The use of personal communicator devices and base station communications devices are described for separate or combined use. The system provides a great deal of latitude with regard to the interconnectivity of individuals and groups with respect to the outside world.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for providing wireless network connectivity, comprising:
   an electronic communications device configured for providing wireless connectivity through a wireless network;
   an identification chip configured for retaining identification information for use in accessing said wireless network by said electronic communications device;
   a receptacle in said electronic communications device for receiving and establishing electrical connections with said identification chip;
   an electro-mechanical lock configured for selectively retaining said identification chip within said receptacle to prevent unauthorized removal;
   a security key configured for retrieving said identification card from said receptacle; and
   a dynamic display on said security key configured for displaying a user readable identification for the electronic communications device in which said identification chip was recently received.

2. An apparatus as recited in claim 1, wherein said electronic communications device is configured for accessing a cellular or satellite based wireless communications network in response to identification information retained in said identification chip.

3. An apparatus as recited in claim 1:
   wherein said identification information retained in said identification chip must be valid in order to access said network; and
   wherein said identification information is utilized for billing accesses made through said network.

4. An apparatus as recited in claim 1, further comprising rewritable memory within said identification chip which is configured for retaining user parameters.

5. An apparatus as recited in claim 1, wherein said receptacle is configured to receive said identification chip without the need to remove access panels and/or batteries from said electronic communications device.

6. An apparatus as recited in claim 1, wherein said receptacle comprises a slot configured for slidably receiving said identification chip.

7. An apparatus as recited in claim 1, wherein said electro-mechanical lock is configured to remain in a locked position when no power is applied and to release said identification chip for removal in response to the receipt of a proper electrical signal.

8. An apparatus as recited in claim 1, further comprising means for generating the proper electrical signals for releasing said identification chip in response to verifying user authority.

9. An apparatus as recited in claim 8, wherein said user authority is verified by said means for generating the proper electrical signals in response to checking for the entry of a proper personal identification code or receipt of a proper biometric identification.

10. An apparatus as recited in claim 8, further comprising a security key configured for verifying user authority when coupled to said electronic communications device.

11. An apparatus as recited in claim 1, further comprising a security key configured for retrieving said identification card from said receptacle.

12. An apparatus as recited in claim 11, wherein said security key is configured for verifying user authority when coupled to said electronic communications device.

13. An apparatus as recited in claim 11, further comprising programming executable on said electronic communications device for validating that a match exists between said security key and said identification chip prior to disengagement of said electro-mechanical lock from said identification card in response to receipt of a proper electrical signal.

14. An apparatus as recited in claim 11, wherein said identification chip cannot be retrieved from said electronic device without said security key being utilized in a retrieval process.

15. An apparatus as recited in claim 1, wherein said electro-mechanical lock is retained in a locked position when no power is applied.

16. An apparatus as recited in claim 1, wherein said identification chip is configured to sustain sufficient damage, in response to forced removal of said identification chip from said electro-mechanical lock, preventing further use of said identification chip.

17. An apparatus as recited in claim 16, wherein said identification chip is configured as mechanically frangible, electrically frangible, or erasable.

18. An apparatus as recited in claim 1, wherein said identification chip is configured with read-writable memory for storing parameters associated with a communications device or a user.

19. An apparatus for sharing wireless network connectivity between a plurality of extensions, comprising:
a base station configured for providing wireless connectivity through a wireless network;
a plurality of receptacles in said base station configured for receiving and establishing electrical connections with identification chips that provide access to a wireless network;
a plurality of electra-mechanical locks configured for preventing unauthorized removal of said identification chips from said plurality of receptacles;
means for communicating between said base station and a plurality of extensions;
means for sharing wireless connectivity of said base station, within whose receptacles have been received at least one identification chip, with one or more of said plurality of extensions;
a security key configured for retrieving a said identification chip from a said receptacle; and
a dynamic display on said security key configured for displaying a user readable identification for the electronic device in which a said identification chip was recently received.

20. An apparatus for sharing wireless network connectivity between a plurality of extensions, comprising:
a base station configured for providing wireless connectivity through a wireless network;
a plurality of receptacles in said base station configured for receiving and establishing electrical connections with identification chips that provide access to a wireless network;
a plurality of electro-mechanical locks configured for preventing unauthorized removal of identification chips from said plurality of receptacles;
means for communicating between said base station and a plurality of extensions; and
means for sharing wireless connectivity of said base station, within whose receptacles have been received at least one identification chip, with one or more of said plurality of extensions;
wherein said electra-mechanical locks selectively retain said identification chips in response to the receipt of electrical signals;
wherein a said identification chip is configured to sustain sufficient damage, in response to forced removal of said identification chip from said electro-mechanical lock, preventing further use of said identification chip;
wherein said identification chip is configured as mechanically frangible or electrically frangible or erasable; and
wherein said identification chip is configured with a fusible link through which a destructive level of current is passed in response to forced removal of the device.

21. An apparatus as recited in claim 18 or 20, wherein said base station is configured for deployment in a home, office, or mobile environment.

22. An apparatus as recited in claim 18 or 20, wherein said base station comprises a cellular or satellite based communications device.

23. An apparatus as recited in claim 18 or 20, wherein said base station is configured for accessing a cellular or satellite based network communications system.

24. An apparatus as recited in claim 18 or 20:
wherein identification information retained in a said identification chip must be valid in order to access said wireless network; and
wherein said identification information is utilized for billing accesses made through said wireless network.

25. An apparatus as recited in claim 18 or 20, further comprising rewritable memory within a said identification chip which is configured for retaining user parameters.

26. An apparatus as recited in claim 18 or 20, wherein a said receptacle is configured to receive a said identification chip without the need to remove access panels or batteries from said base station.

27. An apparatus as recited in claim 18 or 20, wherein a said receptacle comprises a slot configured for slidably receiving a said identification chip.

28. An apparatus as recited in claim 18 or 20, wherein a said electro-mechanical lock is configured to remain in a locked position when no power is applied and to release a said identification chip for removal in response to the receipt of a proper electrical signal.

29. An apparatus as recited in claim 28, further comprising means for generating the proper electrical signals for releasing said identification chip in response to verifying user authority.

30. An apparatus as recited in claim 29, wherein said user authority is verified by said means for generating the proper electrical signals in response to checking for the entry of a proper personal identification code or receipt of a proper biometric identification.

31. An apparatus as recited in claim 29, further comprising a security key configured for verifying user authority when coupled to said electronic device.

32. An apparatus as recited in claim 18 or 20, further comprising a security key configured for retrieving a said identification chip from said receptacle.

33. An apparatus as recited in claim 32, wherein said security key is configured for verifying user authority when coupled to said base station.

34. An apparatus as recited in claim 32, further comprising programming executable on said base station for validating that a match exists between said security key and said identification chip prior to disengagement of said electro-mechanical lock from said identification card in response to receipt of a proper electrical signal.

35. An apparatus as recited in claim 32, wherein said identification chip cannot be retrieved from said electronic device without said security key being utilized in a retrieval process.

36. An apparatus as recited in claim 18 or 20, wherein a said electro-mechanical lock is retained in the locked position when no power is applied.

37. An apparatus as recited in claim 18 or 20, wherein a said identification chip is configured to sustain sufficient damage, in response to forced removal of said identification chip from a said electro-mechanical lock, preventing further use of said identification chip.

38. An apparatus as recited in claim 37, wherein said identification chip is configured as mechanically frangible or electrically frangible or erasable.

39. An apparatus as recited in claim 18 or 20, wherein said means for communicating between said base station and a plurality of extensions, comprises local wireless connectivity.

40. An apparatus as recited in claim 39, wherein transmissions on said local wireless connectivity are encrypted for security.

41. An apparatus as recited in claim 18 or 20, wherein said means for communicating between said base station and a plurality of extensions comprises superposing communication signals over a power-line distribution network.

42. An apparatus as recited in claim 18 or 20, wherein said means for communicating between said base station and a plurality of extensions comprises dedicated wired connectivity.

* * * * *